(12) United States Patent
Nasukawa et al.

(10) Patent No.: US 12,277,389 B2
(45) Date of Patent: Apr. 15, 2025

(54) TEXT MINING BASED ON DOCUMENT STRUCTURE INFORMATION EXTRACTION

(71) Applicant: International Business Machines Corporation, Armonk, NY (US)

(72) Inventors: Tetsuya Nasukawa, Kawasaki (JP); Shoko Suzuki, Yokohama (JP); Daisuke Takuma, Toshima-ku (JP); Issei Yoshida, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 17/315,447

(22) Filed: May 10, 2021

(65) Prior Publication Data

US 2022/0358287 A1 Nov. 10, 2022

(51) Int. Cl.
*G06F 40/279* (2020.01)
*G06F 16/93* (2019.01)
*G06F 40/30* (2020.01)

(52) U.S. Cl.
CPC ............ *G06F 40/279* (2020.01); *G06F 16/93* (2019.01); *G06F 40/30* (2020.01)

(58) Field of Classification Search
CPC ........ G06F 40/279; G06F 16/93; G06F 40/30; G06F 16/38
See application file for complete search history.

(56) References Cited

U.S. PATENT DOCUMENTS

| | | | |
|---|---|---|---|
| 8,892,422 B1 * | 11/2014 | Kumar | G06F 40/284 704/10 |
| 9,348,920 B1 * | 5/2016 | Kesin | G06F 16/93 |
| 2002/0116398 A1 | 8/2002 | Sugaya et al. | |
| 2004/0024739 A1 * | 2/2004 | Copperman | G06F 16/3338 707/E17.084 |
| 2012/0278060 A1 * | 11/2012 | Cancedda | G06F 40/44 704/2 |
| 2014/0019438 A1 * | 1/2014 | Le Chevalier | G06F 16/248 707/741 |
| 2015/0161521 A1 * | 6/2015 | Shah | G06F 3/0481 715/705 |

(Continued)

FOREIGN PATENT DOCUMENTS

JP 2002183175 A 6/2002
JP 2007128224 A 5/2007

(Continued)

OTHER PUBLICATIONS

Denny, Joshua C., et al. "Evaluation of a method to identify and categorize section headers in clinical documents." Journal of the American Medical Informatics Association 16.6 (2009): pp. 806-815. (Year: 2009).*

(Continued)

*Primary Examiner* — Jesse S Pullias
*Assistant Examiner* — Michael C. Lee
(74) *Attorney, Agent, or Firm* — Daniel M. Yeates

(57) ABSTRACT

Frequent sequences extracted from a set of documents according to a common rule are obtained. Based on comparing occurrence frequencies of various sequences, confidence of the first frequent sequence being a label expression representing a document part in a target document is evaluated. Keywords are extracted from the target document based on evaluation of the confidence.

14 Claims, 13 Drawing Sheets

(56) References Cited

U.S. PATENT DOCUMENTS

| | | | |
|---|---|---|---|
| 2017/0132205 A1* | 5/2017 | Novitskiy | G06F 40/284 |
| 2020/0320170 A1* | 10/2020 | Bellert | G06F 40/205 |
| 2021/0081613 A1* | 3/2021 | Begun | G06N 20/00 |

FOREIGN PATENT DOCUMENTS

| | | |
|---|---|---|
| JP | 2009271772 A | 11/2009 |
| JP | 2010224823 A | 10/2010 |

OTHER PUBLICATIONS

Pomares-Quimbaya, et al. "Current approaches to identify sections within clinical narratives from electronic health records: a systematic review." BMC medical research methodology 19 (2019): pp. 1-20. (Year: 2019).*

Wei, Mengxi, et al. "Robust layout-aware IE for visually rich documents with pre-trained language models." Proceedings of the 43rd International ACM SIGIR Conference on Research and Development in Information Retrieval. 2020, pp. 2367-2376 (Year: 2020).*

"Python Strings are Arrays", available at https://web.archive.org/web/20210509023147/https://www.w3schools.com/python/gloss_python_strings_are_arrays.asp, archived on May 9, 2021) (Year: 2021).*

"Python Slice Strings", available at https://web.archive.org/web/20230508083439/https://www.w3schools.com/python/gloss_python_string_slice.asp (archived on May 8, 2021) (Year: 2021).*

Rajman, Martin, et al. "Text mining: natural language techniques and text mining applications." Data Mining and Reverse Engineering: Searching for semantics. IFIP Seventh Conference on Database Semantics (DS-7) Oct. 7-10, 1997, pp. 50-65 (Year: 1997).*

Matsuo et al., "Keyword Extraction From a Single Document Using Word Co-Occurrence Statistical Information," World Scientific, International Journal on Artificial Intelligence Tools, vol. 13, No. 1, 2004, 14 pages.

* cited by examiner

| FSC | Primary Confidence Value |
|---|---|
| Inventor: | 0.85 |
| [Inventor] | 0.92 |
| Claim | 0.78 |
| ... | ... |

| Document ID | FCS | Secondary Confidence Value |
|---|---|---|
| DOC_1 | Inventor: | 0.75 |
| DOC_2 | [Inventor] | 0.98 |
| DOC_3 | Claim | 0.62 |
| ... | ... | ... |

| Key | Value | Category Label |
|---|---|---|
| NAME | John Smith | Inventor |
| NAME | Taro Yamada | Inventor |
| ... | ... | ... |

TEXT MINING BASED ON DOCUMENT STRUCTURE INFORMATION EXTRACTION

BACKGROUND

The present disclosure, generally, relates to text mining technology and, more particularly, to a computer-implemented method, a computer system and a computer program product for performing text mining on a document.

"Text mining" refers to a practice of analyzing text in documents in an attempt to extract information from the document (such as keywords). Documents that are written according to a predetermined document form such as annual securities reports of companies and patent specifications may include common expressions observed in almost every such document for structuring the contents. For example, the annual securities reports may include several sections, which are preceded by formulaic section headings such as "Business risk," "Business details," etc. The patent specifications may also include several sections, which are preceded by formulaic section headings such as "Background," "Summary," "Detailed description," etc.

SUMMARY

Some embodiments of the present disclosure can be illustrated as a method. The method includes obtaining one or more frequent sequences extracted from a set of documents having structured contents at least in part according to a common rule. The method also includes evaluating, based on at least occurrence frequency change relating to a first frequent sequence among the one or more frequent sequences, confidence of the first frequent sequence being a label expression representing a document part in a target document, in which the first frequent sequence is a frequent sequence observed in the target document. The method further includes extracting one or more keywords from the target document based on evaluation of the confidence of the first frequent sequence.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1A:
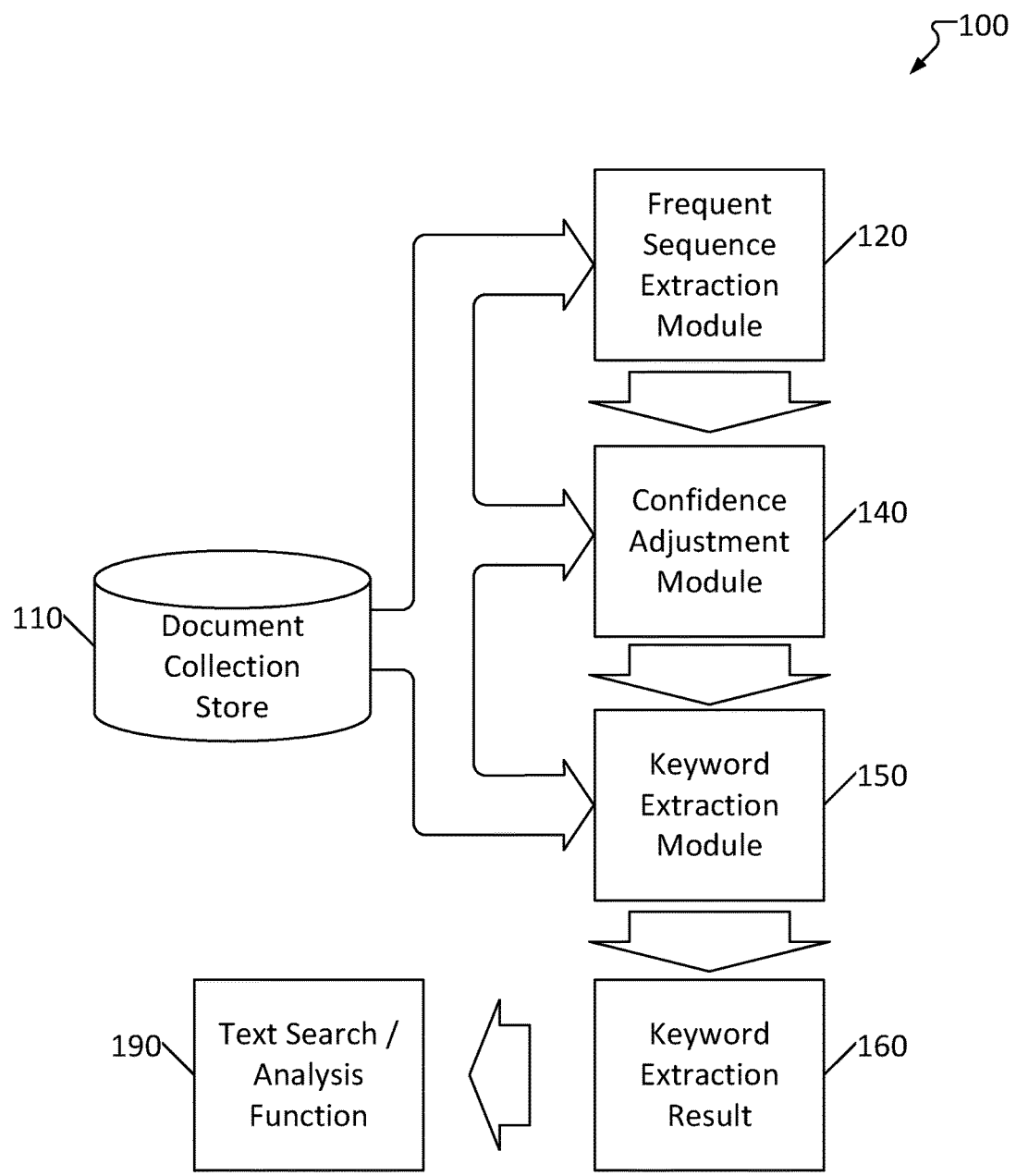
FIG. 1A illustrates a schematic of a text mining system, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to identify a frequent sequence in a collection of documents, determine a confidence that the frequent sequence is a label expression, and label and extract keywords from the documents based on the confidence. Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for performing text mining on a document. The document may be written in a natural language.

Text mining of a document typically requires the document to first be preprocessed, dividing the document into "non-analysis" parts and "analysis" parts. "Non-analysis" parts include parts of the document that do not include particularly useful information such as common expressions/phrases. "Analysis" parts, in contrast, include parts that may yield useful information. This preprocessing step is often resource-intensive.

Systems and methods consistent with the present disclosure enable text mining of documents with improved resource efficiency. The text mining of the present disclosure is accomplished through three main steps: Extracting frequent sequences, adjusting confidence values, and extracting keywords.

An example method consistent with the present disclosure includes at least one of: obtaining one or more frequent sequences extracted from a collection (or "set") of documents that have structured contents at least in part according to a common rule; evaluating, based on at least occurrence frequency change relating to a first frequent sequence among the one or more frequent sequences, confidence of the first frequent sequence being a label expression representing a document part in a target document, in which the first frequent sequence is a frequent sequence observed in the target document; and extracting one or more keywords from the target document based on evaluation of the confidence of the first frequent sequence.

A "frequent sequence" may be a sequence of frequently occurring characters or words in the set of documents. For purposes of this disclosure, frequent sequences are primarily referred to as Frequent Character Sequences (FCSs). A "label expression" may be a section or subsection title or heading that represents a section or sub-section and precedes the contents of the section or sub-section, for instance. The documents in the set may be written such that the contents of the documents are organized according to a predetermined common rule with respect to a document form. The document may be in "plaintext" format (i.e., the document may not have any markups formatting the structure of the document). However, the text mining according to the embodiment of the present invention can be performed regardless of the presence or the absence of such markups.

Figure 5:
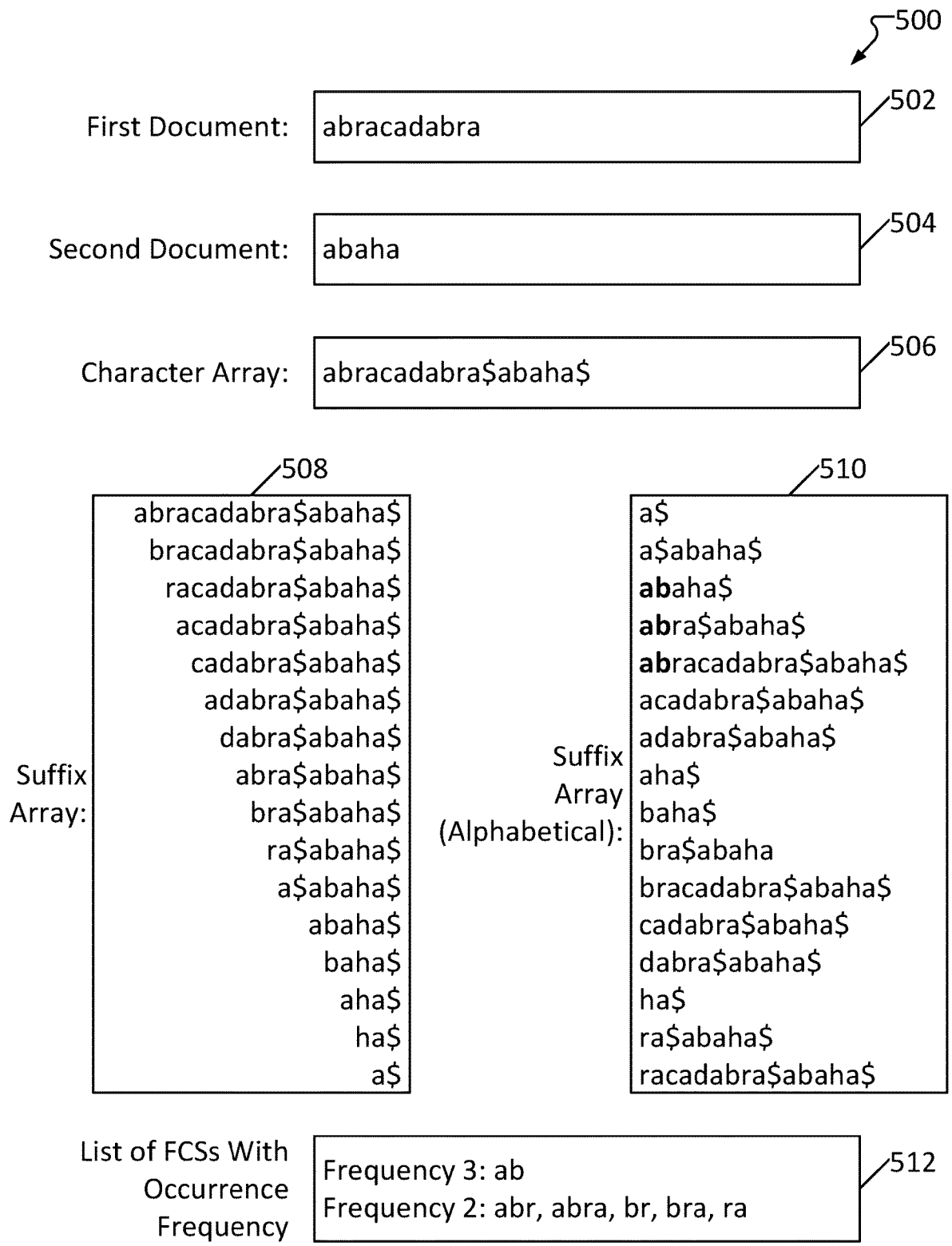
FIG. 5 illustrates data structures generated during the first subprocess shown in FIG. 4, consistent with several embodiments of the present disclosure.

In order to extract frequent sequences from a set of documents, the set of documents may be processed to concatenate all the characters of all of the documents into a character array. This enables simple evaluation of sequences, denoted s, within the set of documents, as well as an "occurrence frequency" for each sequence, denoted freq(s). The occurrence frequency represents a number of instances that a given sequence is found across the set of documents. For example, a sequence "even" may appear twelve times across a set of documents, such that freq(even)=12. Sequences may be extracted from the set of documents and designated "frequent sequences" based upon their occurrence frequency. Some examples describing how "frequent sequences" may be selected include: The ten sequences having the highest occurrence frequency, any sequences having an occurrence frequency above an occurrence threshold; the top 10% of sequences organized by occurrence frequency, etc. An example concatenation, character array, and sequence evaluation is depicted in FIG. 5.

Frequent sequences may be associated with "confidence values." A confidence value represents a confidence that the frequent sequence is a label expression (such as, for example, a section title, header, etc.). Confidence values may be calculated for some or all of the frequent sequences. As an overview, a confidence value for a given sequence is initially determined based upon occurrence frequency of the given sequence, occurrence frequencies of shorter sequences that the given sequence includes, and occurrence frequencies of longer sequences that include the given sequence.

The confidence may be evaluated in a manner based on a comparison of occurrence frequencies between a first frequent sequence and a longer second frequent sequence, where the second frequent sequence contains the first frequent sequence. As a non-limiting example, a confidence value for a sequence s may be calculated according to Equation 1, below:

$$\text{conf}(s)=\text{conf}_1(s)\cdot\text{conf}_2(s) \qquad (1)$$

Where $\text{conf}_1(s)$ may be determined based upon an occurrence frequency of s and an occurrence frequency of a second sequence x included within s, according to Equation 2, below:

$$\text{conf}_1(s)=\text{freq}(s)/\text{freq}(x) \qquad (2)$$

And where $\text{conf}_e(s)$ may be determined based upon an occurrence frequency of s, an occurrence frequency of a third sequence y which includes s, and a weighting factor b (typically a positive real number less than 1, such as 0.7), according to Equation 3, below:

$$conf_2(s) = \left(1 - \frac{freq(y)}{b \cdot freq(s)}\right) \qquad (3)$$

As an example, "even" may be a first sequence having an occurrence frequency freq(even). A second sequence "eve" may have an occurrence frequency of freq(eve). A longer third sequence "event" contains the first sequence (i.e., "event" is longer than but also contains "even") may have an occurrence frequency freq(event). The confidence value describing a confidence that "even" is a label expression may be evaluated based upon a first comparison between freq(even) and freq(eve) and a second comparison between freq(even) and freq(event). In general, a confidence value (conf(s)) of the first frequent sequence being the label expression may be relatively low if the first frequent sequence is a partial sequence of a longer second frequent sequence having a similar occurrence frequency to the partial sequence. For example, if the first sequence is "even" and the second sequence is "event" and freq(even) and freq(event) are relatively similar, it may be unlikely that "even" is a label expression. This can be seen in Equations (1) and (3); $\text{conf}_2(\text{even})=1-\text{freq}(\text{event})/(b*\text{freq}(\text{even}))$, where freq (event) and freq(even) are similar, will be close to zero. As $\text{conf}(\text{even})=\text{conf}_1(\text{even})*\text{conf}_2(\text{even})$, $\text{conf}_2$ (even) being near-zero will result in conf(even) being near-zero, meaning a confidence that "even" is a label expression is low.

In some instances, if a confidence value for a frequent sequence is below an inclusion threshold, the frequent sequence may be disregarded for purposes of identifying label expressions.

As confidence values for frequent sequences calculated as described above account for sequences across all documents in a set, they are referred to as "collection-level" confidence values. A collection-level confidence value for a frequent sequence may be adjusted, resulting in a secondary confidence value for the frequent sequence specific to a target document of the collection (i.e., a "document-level" confidence value).

A system may identify whether or not the frequent sequence includes a symbol (an element in a predefined collection of formatting characters given for the system such as a comma, a period, a bracket, a colon (e.g., "[", "]", ":", etc.)). If the sequence includes a symbol, the system may further decompose the frequent sequence into a "symbol part" and a "remaining part," compute a likelihood of the symbol being contained in any frequent sequence observed in the target document, and adjust (i.e., increase or decrease) the collection-level confidence value for the frequent sequence including the symbol according to the likelihood. This adjustment results in the secondary confidence value (i.e., a document-level confidence value). For clarity, the primary confidence value remains unchanged as a result of the "adjusting"; for example, a primary confidence value of 0.8 may be "adjusted" by −0.1, resulting in a secondary confidence value of 0.7. In such an example, after the "adjustment," the primary confidence value is still 0.8.

In some instances, the confidence value for a frequent sequence within a target document (i.e., the document-level confidence value) may be utilized as the confidence value for the same frequent sequence across the set of documents (i.e., the collection-level confidence value).

Systems and methods consistent with the present disclosure may also extract keywords from target documents, resulting in a list of extracted keywords. A keyword may have two components, organized in a (key, value) manner. For example, an extracted keyword may be ("Name," "John Doe"). If a keyword in the list overlaps with a frequent sequence and the frequent sequence has a confidence value sufficient to designate the frequent sequence as a label expression, the keyword can be removed from the list of extracted keywords. Further, a label relating to the frequent sequence can be assigned to a keyword based on positions where the frequent sequence and the keyword have appeared (e.g., nearest upper one). In some instances where the frequent sequence is decomposed into a symbol part and a remaining part, the remaining part may be used as the label associated with the at least one keyword.

FIG. 1A illustrates a schematic of a text mining system 100, consistent with several embodiments of the present disclosure. The text mining system 100 shown in FIG. 1A is configured to process text data and provide search and analysis functionality based on terms and phrases (herein, both a term and a phrase are referred to as "keywords") extracted from the text data. As shown in FIG. 1A, the text mining system 100 includes a document collection store 110, a frequent sequence extraction module 120, a confidence adjustment module 140 and a keyword extraction module 150.

The document collection store 110 is configured to store a collection (or a set) of documents (D={$d_1, d_2, \ldots, d_N$}) that may be written according to a predetermined common rule with respect to a particular document form. The documents may be any kind of text data, including annual security reports of companies, patent specifications, etc. The document collection store 110 is provided by any internal or external storage (e.g., memory, persistence storage) in a computer system.

The documents may be written in a particular natural language such as English or Japanese and may be typically plain text data that does not have any markup (e.g., HTML tags, etc.) formatting the structure of the document. Although the original document may have formatting structure such as xml or a MICROSOFT® OFFICE® document, in the text mining system 100 each document may be received as a set of records stored in a database in a plaintext format such as VARCHAR. The original formatting structure in the document may be ignored or processed as a character sequence. For example, a paragraph structure may be converted into a line feed character. Notably, this does not prevent the document from containing markups; the text mining according to the present disclosure can be performed regardless of the presence or the absence of markups.

As described above, each of the documents stored in document collection store 110 have may include several common expressions representing a specific document part, which may be a section or subsection title or heading representing a section or subsections. Such label expressions are common in documents in a sense that all or most documents of a given type are divided into the same or similar document parts due to a predetermined rule of the document type. For example, annual securities reports generally include several formulaic sections such as "Business risk" and "Business details" (although the individual expressions may be slightly different). Note that section or subsection titles or headings may be identical or variable over the documents in a manner depending on the predetermined rule.

Although the documents are generally written according to a predetermined rule, the predetermined rule for writing a document to meet the requirement of the particular document type may not be known to the text mining system 100. The task of the text mining system 100 is to extract such label expressions from a given set of documents without complete knowledge of the predetermined rule of the document type.

Frequent sequence extraction module 120 is configured to extract frequent sequences from the set of documents stored in the document collection store 110. In some embodiments, each frequent sequence may be a frequently occurring character sequence or a frequently occurring word sequence; similarly, the documents may be organized into character sequences or word sequences. However, organizing a document into word sequences may require use of various parsing or syntax analysis techniques, which may not be well developed for many languages. Thus, in some embodiments, it may be preferable to represent each document by a character sequence and the frequent sequences extracted from each document may be frequently occurring character sequences. Employing the character sequence is advantageous in that the process can be applied to even minor languages, in which parsing or syntax analysis techniques are not well developed. Frequent sequence extraction module 120 may also be configured to compute occurrence frequency of each sequence (freq(s)) across the set of documents.

Confidence adjustment module 140 is configured to evaluate a confidence of each frequent sequence being a label expression representing a document part in a target document. The confidence value is evaluated in a manner based on at least an occurrence frequency comparison relating to each frequent sequence. The frequent sequence for which the confidence is evaluated is a frequent sequence observed in the target document. As an example, a sequence that occurs repeatedly in a first document but does not occur at all in a second document, where the target document is the second document, may have a confidence value of zero for the target document. The target document may be one of the documents stored in the document collection store 110. The occurrence frequency comparison relating to each frequent sequence may include a comparison between an occurrence frequency of the frequent sequence (freq (s)) and an occurrence frequency of a longer sequence containing the frequent sequence (freq (y)) (i.e., the frequent sequence s is a substring of the longer sequence y) and/or an occurrence frequency of a substring of the frequent sequence (freq (x)) of the frequent sequence ($s=c_1, c_2, \ldots c_{n-1}, c_n$; $x=c_1, c_2, \ldots c_{n-1}$). This frequency comparison gives a hint for identifying a plausible boundary of the label expression; a frequent sequence that has an occurrence frequency greater than the occurrence frequency of its "superstrings" (i.e., sequences of which the frequent sequence is a substring) and comparable to the occurrence frequency of its substrings may be particularly likely to be a label expression. As an example, if "eve" occurs about as often as "even" but "event" occurs far less often than either "eve" or "even," then "even" may be more likely to be a label expression than either "eve" or "event." "Event" would be less likely to be a label expression because it only occurs rarely, while "eve" is unlikely to be a label expression because it only occurs frequently due to its inclusion in "even."

Keyword extraction module 150 is configured to extract one or more keywords from the target document based on evaluation of the confidence of the frequent sequence observed in the target document. Keyword extraction module 150 is further configured to output a keyword extraction result 160. The frequent sequence found in the target document may be a label candidate and identified as a label expression when a confidence value associated with the frequent sequence is relatively high. The target document from which the one or more keywords are extracted may be the same as the target document for which the confidence is evaluated by confidence adjustment module 140.

More specifically, keyword extraction module 150 is configured to apply keyword extraction to the target document. The result of the keyword extraction may be given as key-value pairs, each consisting of a key representing a type of a keyword (such as "name") and a value representing the content of the keyword (such as "John Smith"). Keyword extraction module 150 is also configured to remove a keyword overlapping with the label expression (i.e., the frequent sequence identified as the label expression) from the result of the keyword extraction. For example, if a keyword value is "Inventor: John Smith" but "Inventor:" is identified as a label expression, keyword extraction module 150 may remove "Inventor:" from the result of the keyword extraction. In some instances, this removal may include modifying the extracted keyword; continuing with the same example, this may result in the keyword value being modified to "John Smith." Keyword extraction module 150 is further configured to assign a label to at least one keyword based on positions where the label expression and the at least one keyword have appeared.

In some embodiments, the keyword is assigned with the nearest upper label. In essence, this constitutes an attempt to associate the keyword with a section of the document the keyword appears in. As an example, a keyword extracted from a document may have a key of "name" and a value of "Jane Doe." Keyword extraction module 150 may be configured to assign a label to the keyword having a value of "Jane Doe" based upon a label expression found in the same document. If the document including "Jane Doe" has multiple label expressions, such as "Title," "Inventor," and "Claims," keyword extraction module 150 may be configured to select the nearest label in the document that appears before the keyword. For example, if "Jane Doe" occurs after "Title" and "Inventor" but before "Claims," and "Title" occurs before "Inventor," then the label expression "Inventor" may be selected and a label "Inventor" may be applied to keyword including "Jane Doe." Worded differently, the document may include, in order, the label expression "Title," then the label expression "Inventor," then the keyword "Jane Doe," and then the label expression "Claims." With this ordering, "Jane Doe" is within the part of the document having the label expression "Inventor," so "Inventor" is selected as the label for the keyword "Jane Doe." Keyword extraction result 160 may include a tuple of (key, value, category label) where the key and the value are extracted by the keyword extraction and the category label is the label expression extracted. Continuing with the same example, keyword extraction result 160 may include a tuple of (Name, Jane Doe, Inventor).

The confidence adjustment and the keyword extraction may be performed for a single target document and/or for every document in the given document collection stored in document collection store 110. The target document or documents for which the confidence adjustment and the keyword extraction are performed may be the same as or separate from that from which the frequent sequences are extracted by frequent sequence extraction module 120. For example, annual securities reports of companies in the past year may be used as the documents for extracting the label expression, and annual securities reports of companies in the current year may be used as the target documents for which the confidence adjustment and the keyword extraction are performed.

As shown in FIG. 1A, text mining system 100 may further include a search/analysis function 190. Search/analysis function 190 may be configured to provide search and analysis functionality based on keyword extraction result 160 output from keyword extraction module 150. The search and/or analysis functionality is not limited, and any known technology can be employed. For instance, keyword extraction result 160 may be presented by a table view, a graph view, etc. For instance, the text search may be performed by designating the keyword and the category label to find a text part matching the keyword and located in a document part indicated by the category label.

Figure 1B:
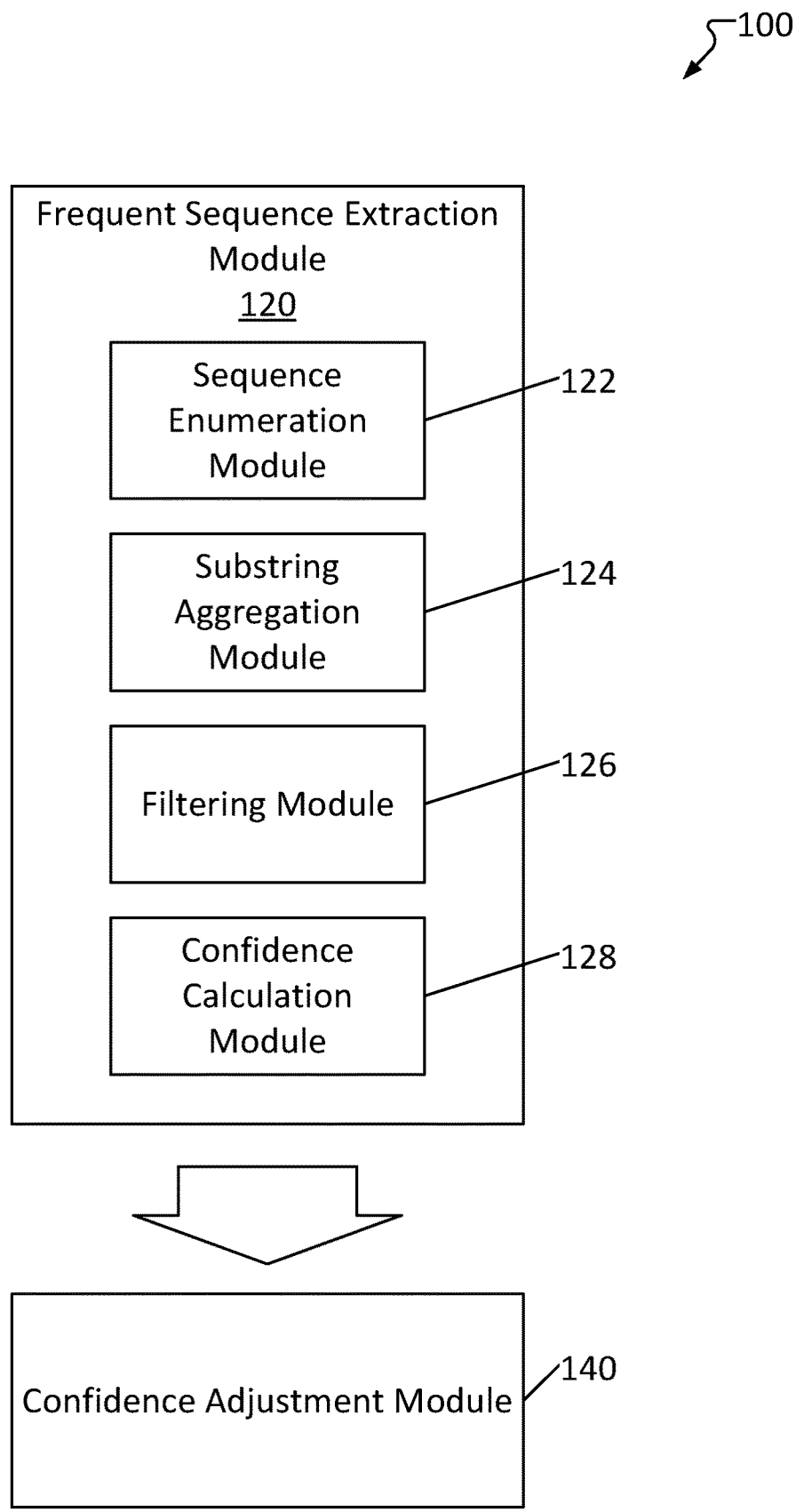
FIG. 1B illustrates a schematic of a frequent sequence extraction module in the text mining system, consistent with several embodiments of the present disclosure.

FIG. 1B illustrates a schematic of a frequent sequence extraction module in the text mining system, consistent with several embodiments of the present disclosure. As shown in FIG. 1B, frequent sequence extraction module 120 may include a sequence enumeration module 122; a substring aggregation module 124; a filtering module 126; and a confidence calculation module 128.

Sequence enumeration module 122 is configured to prepare the set of documents (D) stored in document collection store 110 and enumerate one or more sequences observed in the set of documents based on a predetermined parameter. An occurrence frequency (freq(s)) may be computed for each sequence. The predetermined parameter defines a minimum frequency (f, an integer) and a minimum length (m, an integer) of the sequence for the extraction as the frequent sequence. One or more sequences that satisfy a predetermined condition designated by the parameter are enumerated by sequence enumeration module 122.

Substring aggregation module 124 is configured to choose a sequence from among the enumerated sequences, as one frequent sequence, in response to a condition of maximality for the sequence being met. The condition of maximality may be a condition with respect to occurrence frequency comparison (e.g., a ratio) between the sequence (s) and a longer sequence (y) containing the sequence and used to select the frequent sequence as long as possible by evaluating plausibility of the boundary of the label expression. The substring (or the partial sequence) of the longer frequent sequence having a similar occurrence frequency to the substring may be aggregated into the longer frequent sequence and the substring itself may be discarded from the frequent sequences. Discarding a frequent sequence that is a partial sequence of a longer second frequent sequence having a similar occurrence frequency to the partial sequence is one example of evaluating the confidence.

The term "substring," as used herein, refers to a special case of a subsequence which is defined as a sequence that can be derived from another sequence by deleting one or more elements without changing the order of the remaining elements. A subsequence that consists of a consecutive run of elements from the original sequence is the substring.

Substring aggregation module 124 may be further configured to enumerate an additional sequence based on a predetermined enumeration rule even when the additional sequence is evaluated as likely to be a part of the longer frequent sequence that is more likely to the label expression. The enumeration rule defines a condition for extracting a sequence having a predetermined pattern.

Filtering module 126 is configured to filter the enumerated sequences, which are output by substring aggregation module 124, based on a filtering condition with respect to at least a number of documents containing each sequence (F(s)). The filtering condition may define a condition for extracting those sequences that appear a predetermined number of times in one document and appear uniformly across a plurality of documents. However, the filtering condition is not limited and may be relaxed to allow the passage of sequences.

Confidence calculation module 128 is configured to calculate a primary confidence value for each frequent sequence representing a likelihood that the frequent sequence is the label expression across the set of documents (D) stored in document collection store 110. The confidence value may be, for example, an indicator between 0 and 1 representing the likelihood of the frequent sequence being semantically a real label expression (such as, for example, a section title in a document). Since the primary confidence value is calculated from the set of documents (D), the primary confidence value is referred to as a collection-level confidence value.

The primary confidence value may be calculated in a manner based on a comparison of occurrence frequencies of the frequent sequence (s) and a longer frequent sequence (y) containing the frequent sequence (e.g., a comparison between freq(s) and freq(y)) and/or of the frequent sequence (s) and a shorter frequent sequence x that is a part of the frequent sequence (s) or a substring ($x=c_1, c_2, \ldots c_{n-1}$ where $s=c_1, c_2, \ldots c_{n-1}, c_n$) (e.g., a change between freq(s) and freq(x)). The primary confidence value is calculated with a lower value when the frequent sequence of interest is a partial sequence of a longer frequent sequence having a similar occurrence frequency to the partial sequence.

As described above, confidence calculation module 128 calculates and outputs the primary confidence value for each frequent sequence (i.e., the collection-level confidence value). In contrast, confidence adjustment module 140 is configured to calculate a secondary confidence value for each frequent sequence observed in a target document. Since the secondary confidence value is calculated for each document ($d_t$) the secondary confidence value is referred to as a document-level confidence value.

Although the documents may contain unique expressions, there may be fluctuations in the expressions or variations of the expressions across the documents. For instance, a document written by a certain person according to a given rule of a particular document type may have similar but different expressions (e.g., "Inventor:") in comparison with a similar expression (e.g., "[Inventor]") in other documents written by other people according to the same rule if allowed. In such a situation, when using a certain expression such as "[inventor]", the person might use a similar expression for other category labels in the same document (such as "[applicant]"). Confidence adjustment module 140 try to handle such variation between documents and integrity within each document.

More specifically, confidence adjustment module 140 is configured to adjust the primary confidence value so as to compute a secondary confidence value of the frequent sequence being the label expression in the specific target document. Confidence adjustment module 140 is configured to decompose each frequent sequence into a "symbol part" and a "remaining part" in response to the frequent sequence including a symbol. A "symbol," as used herein, is an element in a predefined collection of formatting characters given for the system such as "[", "]", ":", etc. Confidence adjustment module 140 is configured to compute a likelihood of each symbol being contained in any frequent sequences observed in the target document. Confidence adjustment module 140 is configured to increase or decrease the primary confidence value to obtain the secondary confidence value for the frequent sequence including the symbol according to the likelihood of the corresponding symbol being included in a label expression in the target document.

For instance, if a symbol "[" is frequently included in the frequent sequences in the target document with a high confidence value, then the secondary confidence value of the frequent sequences including the same symbol "[" may be raised in the document. Furthermore, the secondary confidence value of the frequent sequences not including the same symbol "[" may be reduced in the document.

The secondary confidence value (the document-level confidence value) for the target document is computed based on the confidence adjustment from the primary confidence value (the collection-level confidence value) calculated across the set of documents. Since the secondary confidence value is calculated based on the primary confidence value, it can be said that the secondary confidence value is also based on at least an occurrence frequency comparison relating to each frequent sequence. Also, in some embodiments, the confidence value may be calculated by simply calculating a confidence value across the set of documents (i.e., collection-level confidence value) as the confidence value for the target document (i.e., document-level confidence value) without confidence adjustment.

In one or more embodiments, each of modules 120, 140, 150 and 190 shown in FIG. 1A and each of the modules 122, 124, 126 and 128 shown in FIG. 1B may be implemented as a software module including program instructions and/or data structures in conjunction with hardware components such as a processor, a memory, etc.; as a hardware module including electronic circuitry; or as a combination thereof. These modules may be implemented on a single computer device such as a personal computer and a server machine or over a plurality of computer devices in a distributed manner such as a computer cluster of computer devices, client-server system, cloud computing system, edge computing system, etc.

For example, a first computer system implementing frequent sequence extraction module 120 may be separate from a second computer system implementing confidence adjustment module 140 and keyword extraction module 150. In this embodiment, the second computer system may include a module configured to obtain the one or more frequent sequences with their primary confidence values and the occurrence frequencies from frequent sequence extraction module 120.

Document collection store 110 and a storage for storing intermediate results and keyword extraction result 160 may be provided by using any internal or external storage device or medium, to which processing circuitry of a computer system implementing these modules is operatively coupled.

Figure 2:
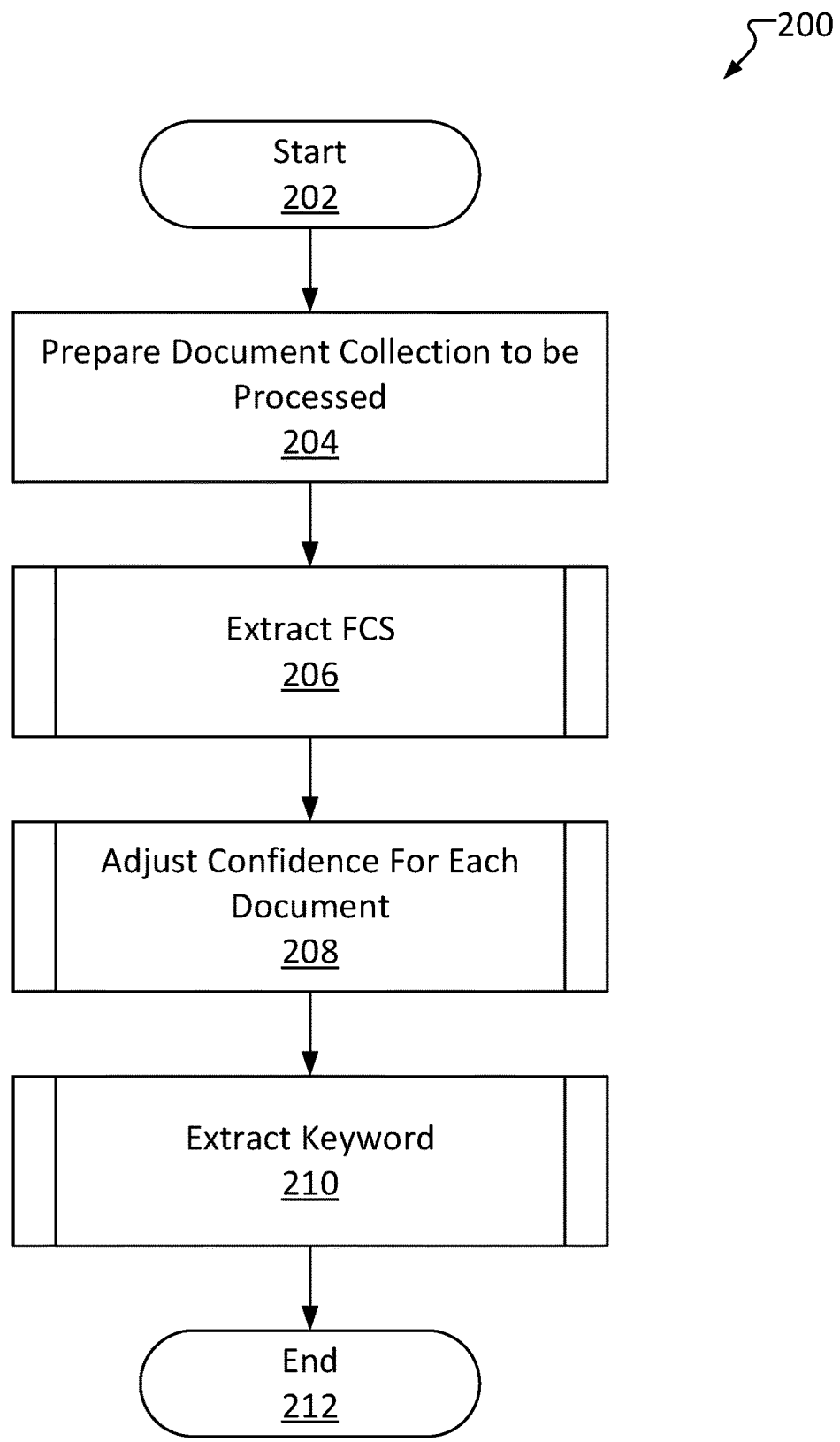
FIG. 2 is a method of a main process for performing text mining on a given set of documents, consistent with several embodiments of the present disclosure.
Figure 3:
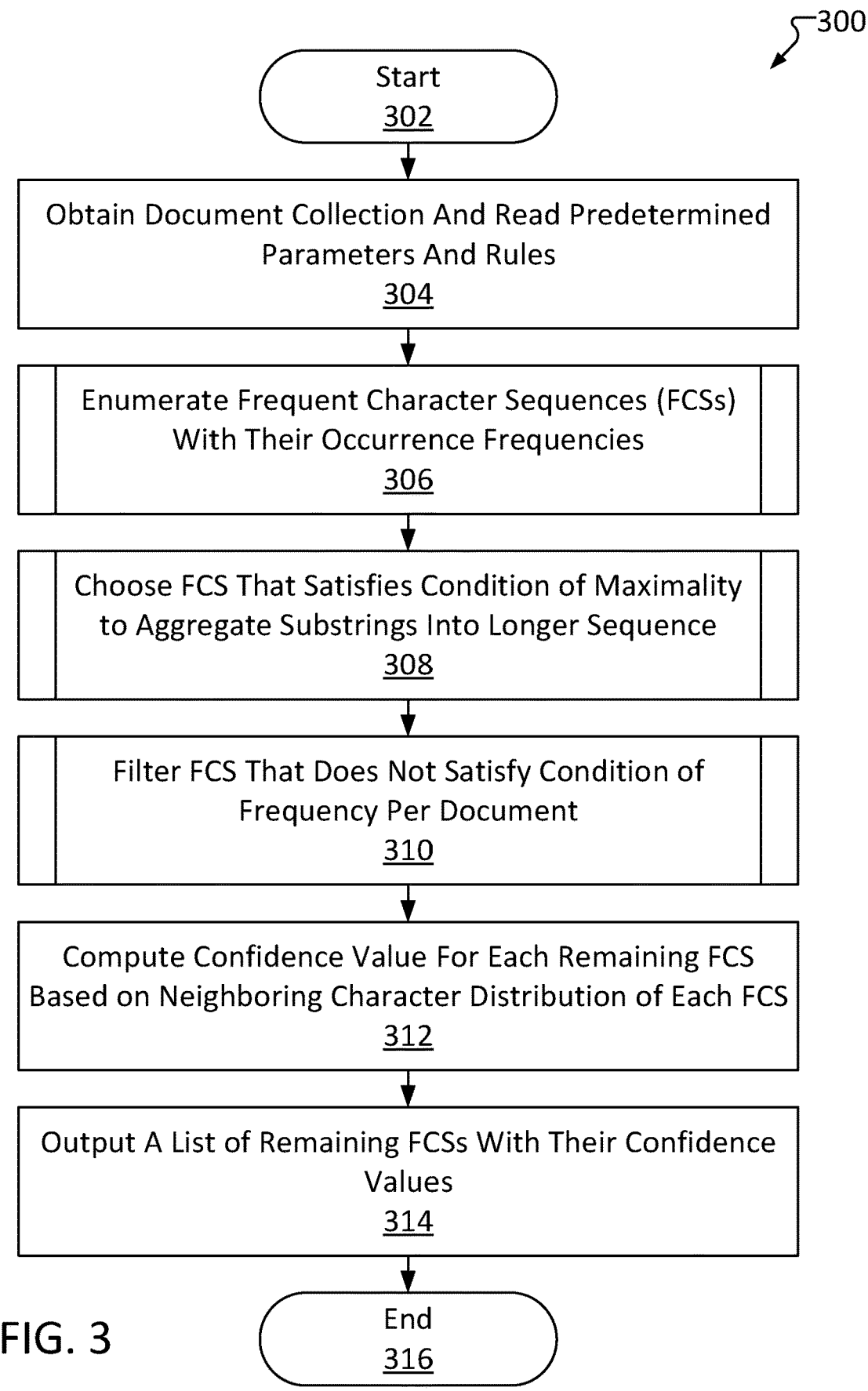
FIG. 3 is a method of a first subprocess in the main process shown in FIG. 2, consistent with several embodiments of the present disclosure.
Figure 4:
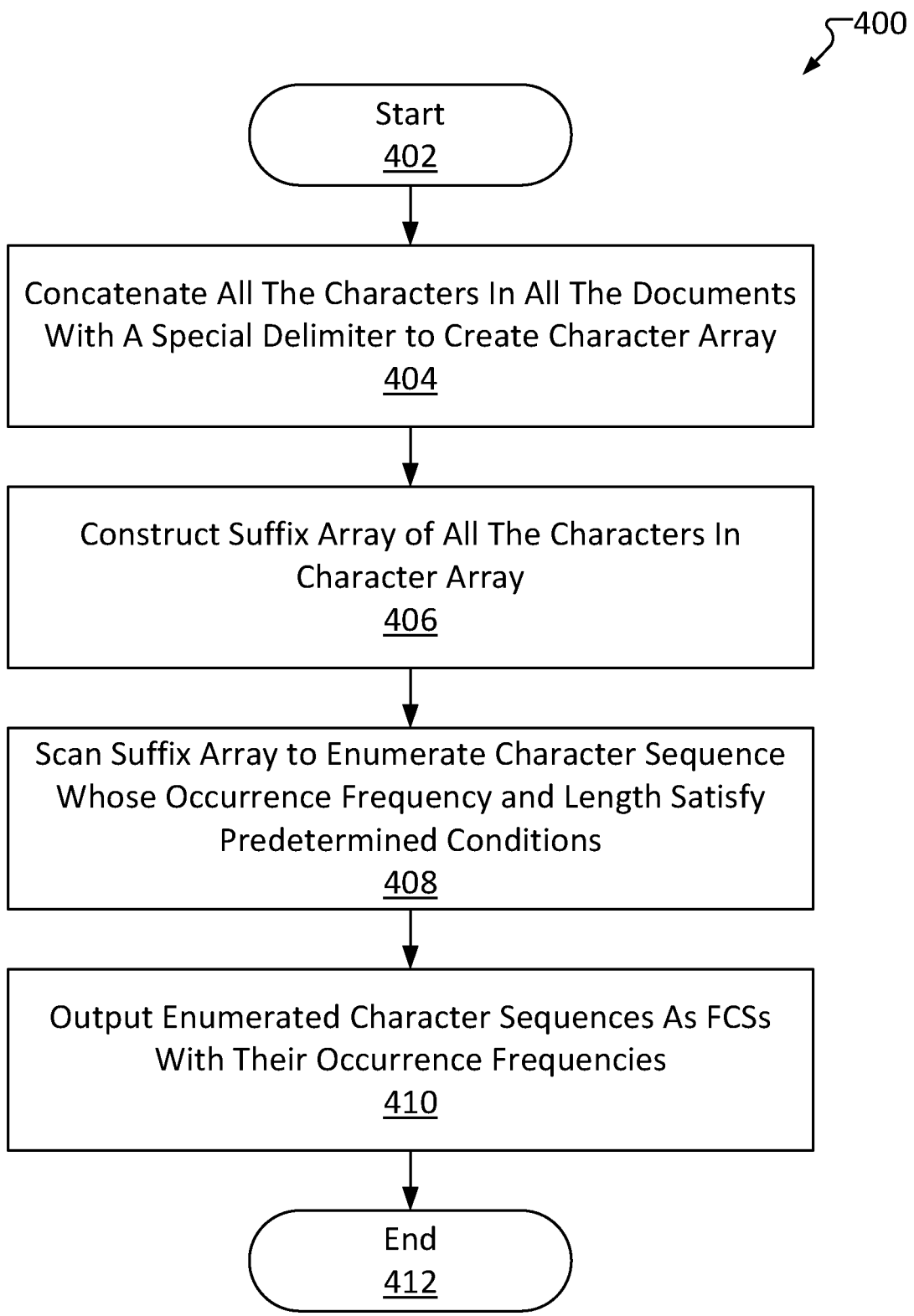
FIG. 4 is a method of a first subprocess of the first subprocess shown in FIG. 3, consistent with several embodiments of the present disclosure.
Figure 6:
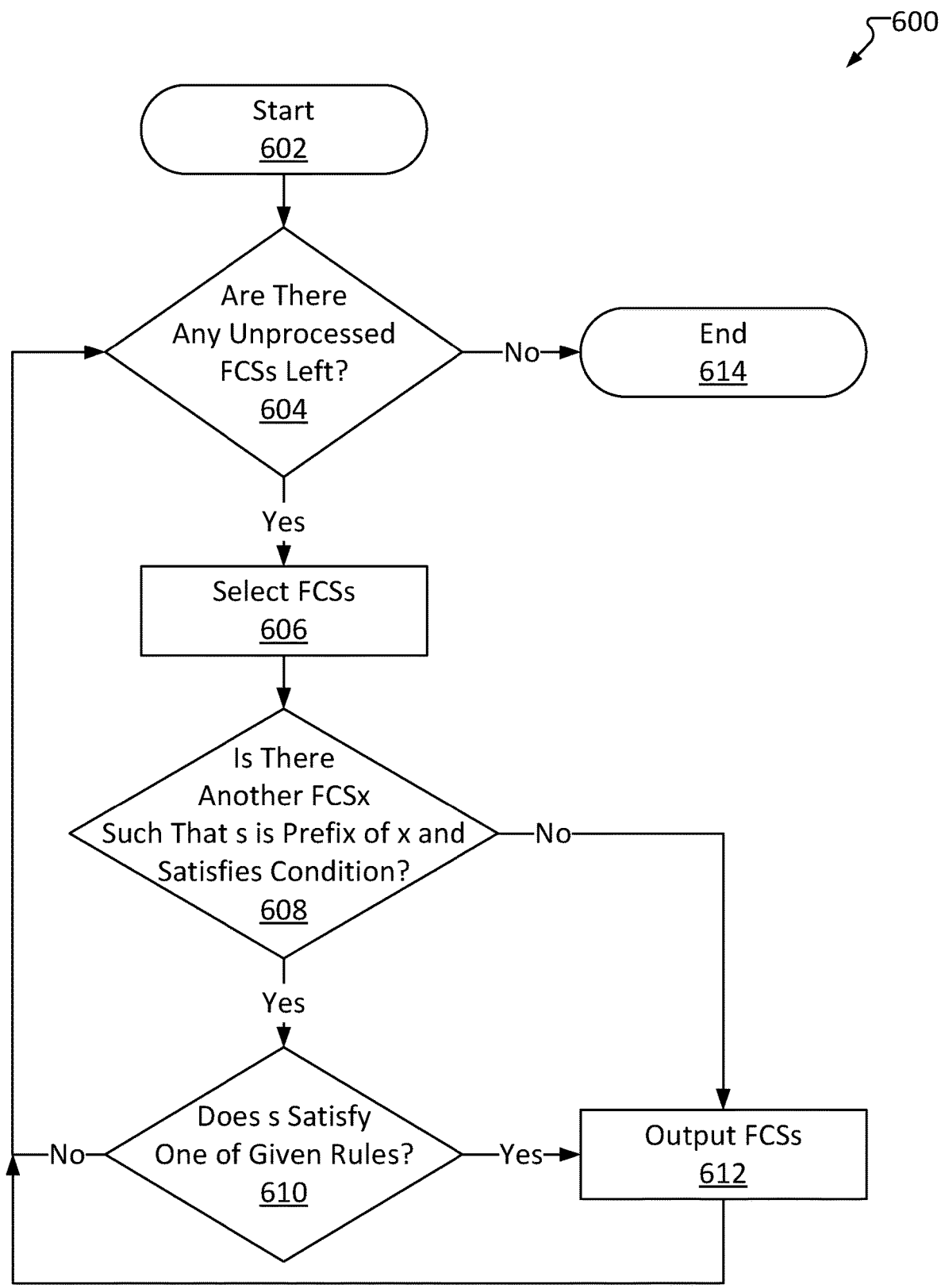
FIG. 6 is a method of a second subprocess of the first subprocess shown in FIG. 4, consistent with several embodiments of the present disclosure.
Figure 7:
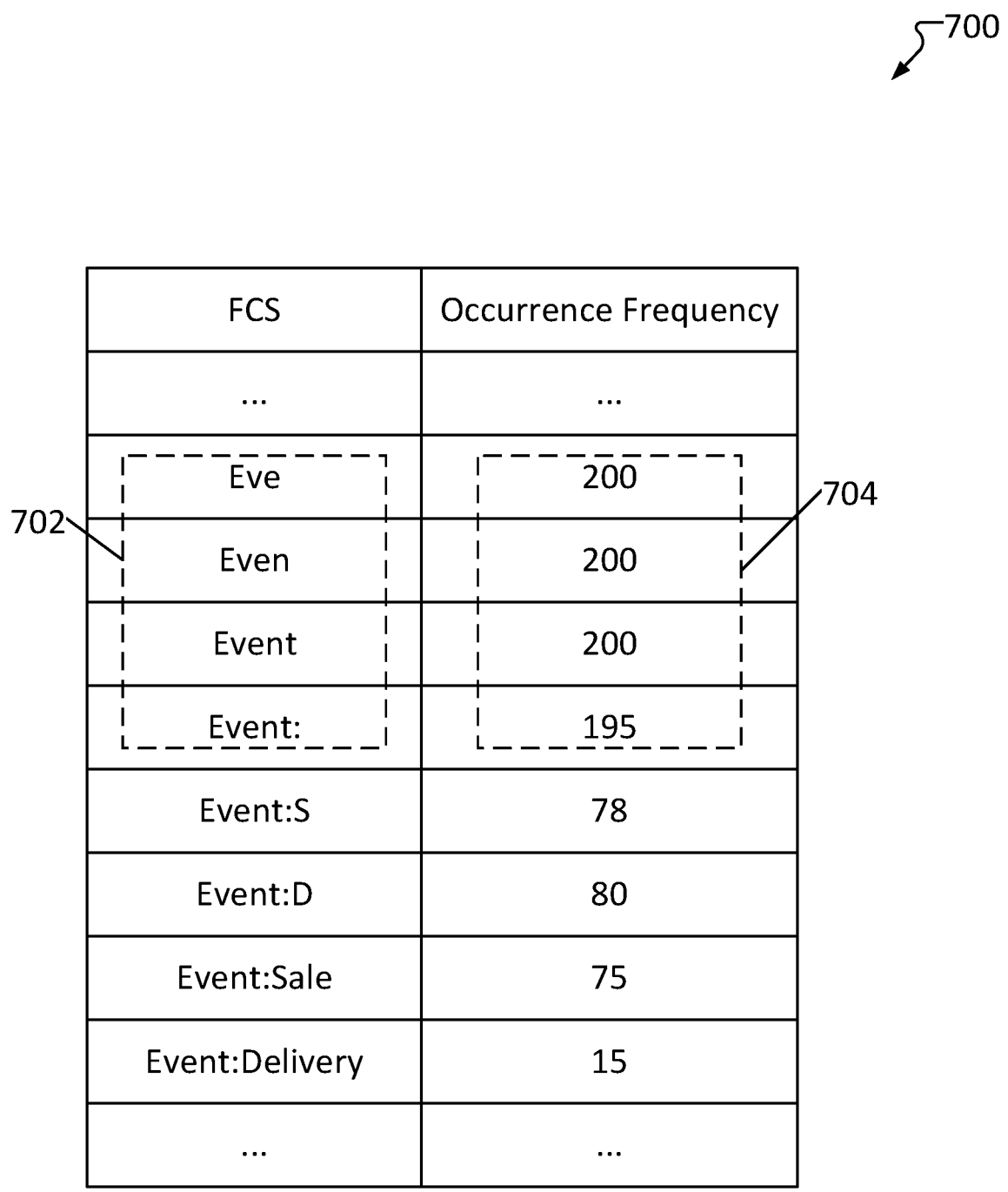
FIG. 7 illustrates an example data structure that may be used in the subprocess shown in FIG. 6, consistent with several embodiments of the present disclosure.
Figure 8:
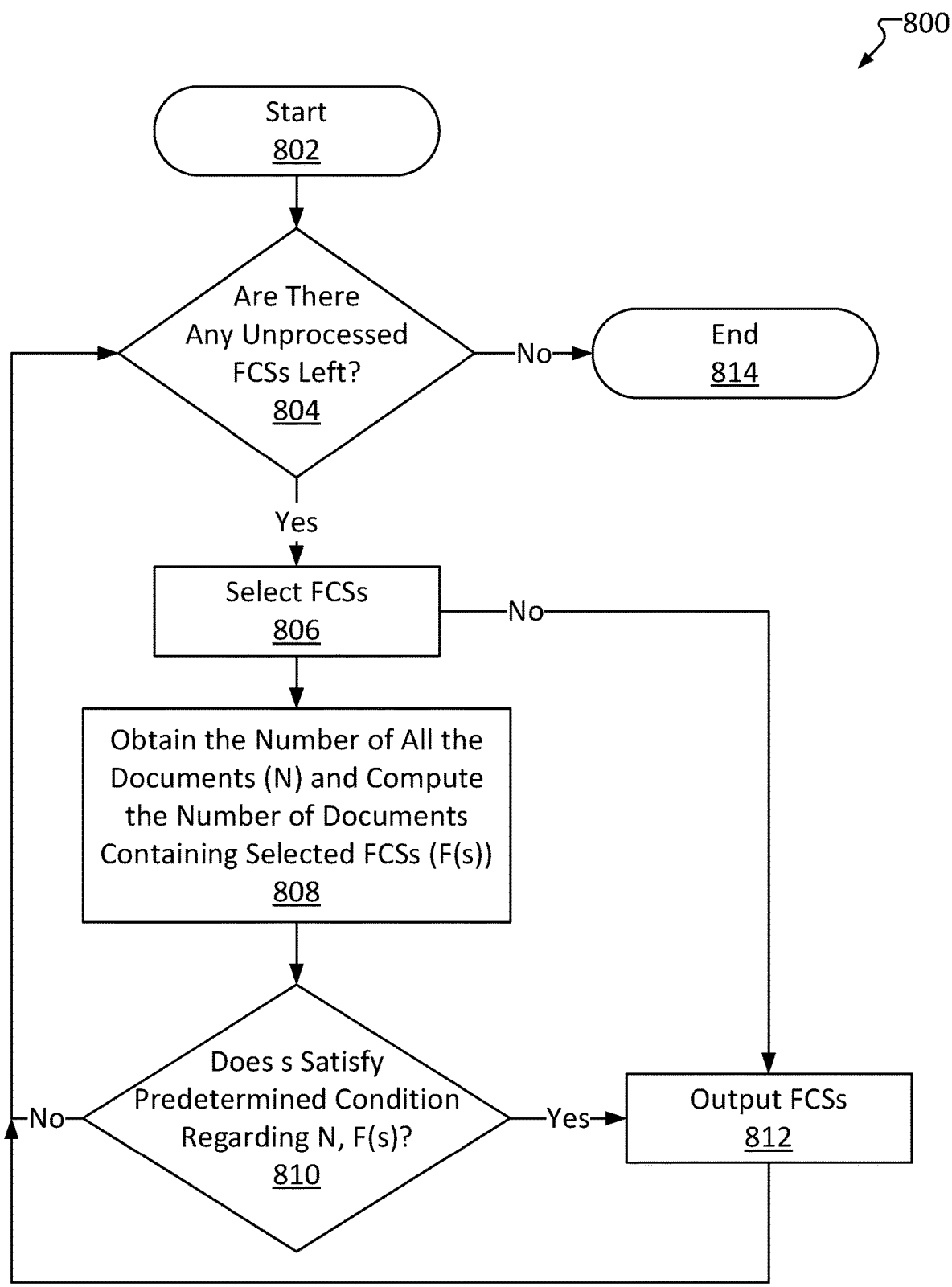
FIG. 8 is a method of a third subprocess of the first subprocess shown in FIG. 3, consistent with several embodiments of the present disclosure.
Figure 9:
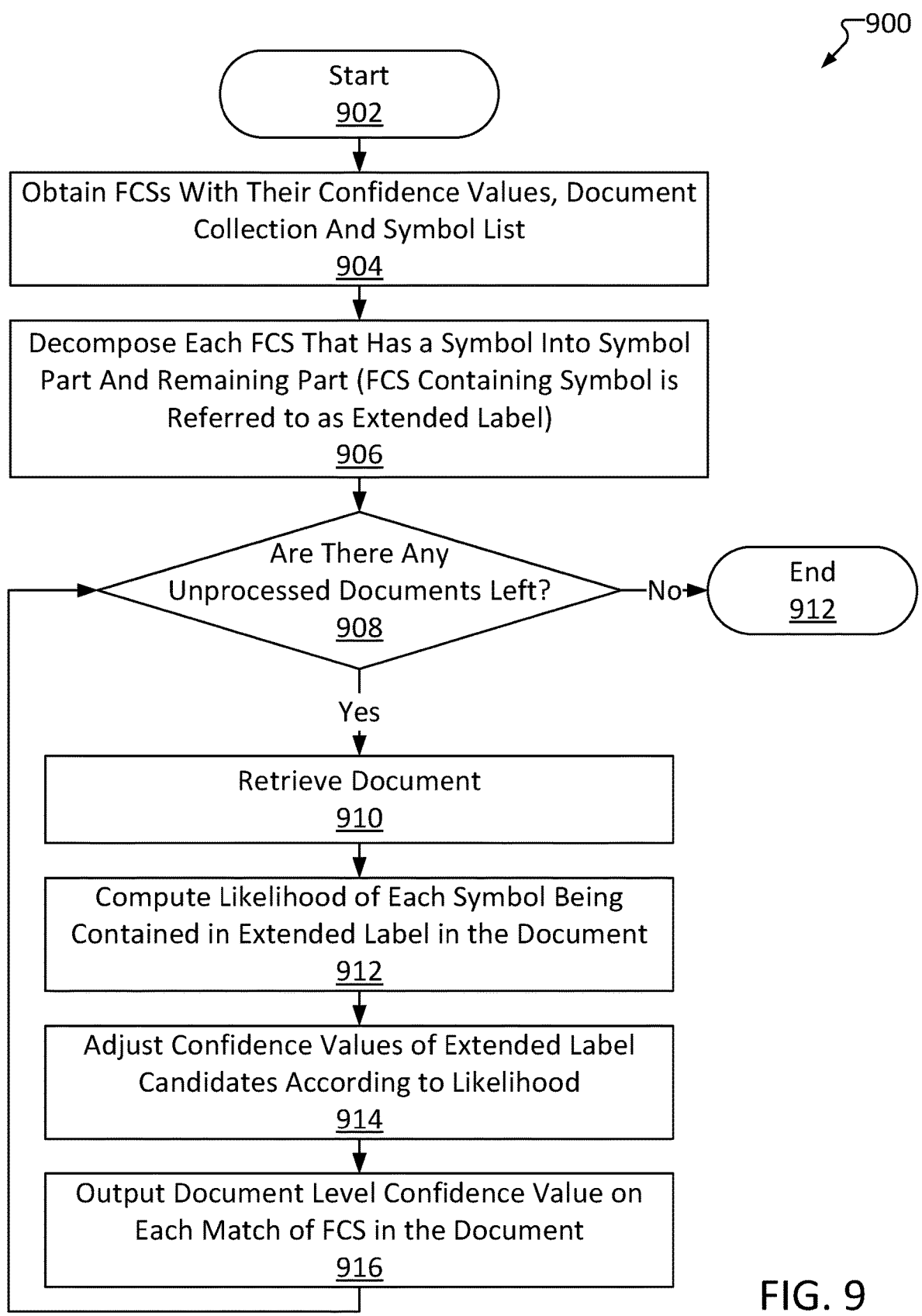
FIG. 9 is a method of a second subprocess in the main process shown in FIG. 2, consistent with several embodiments of the present disclosure.
Figure 10:
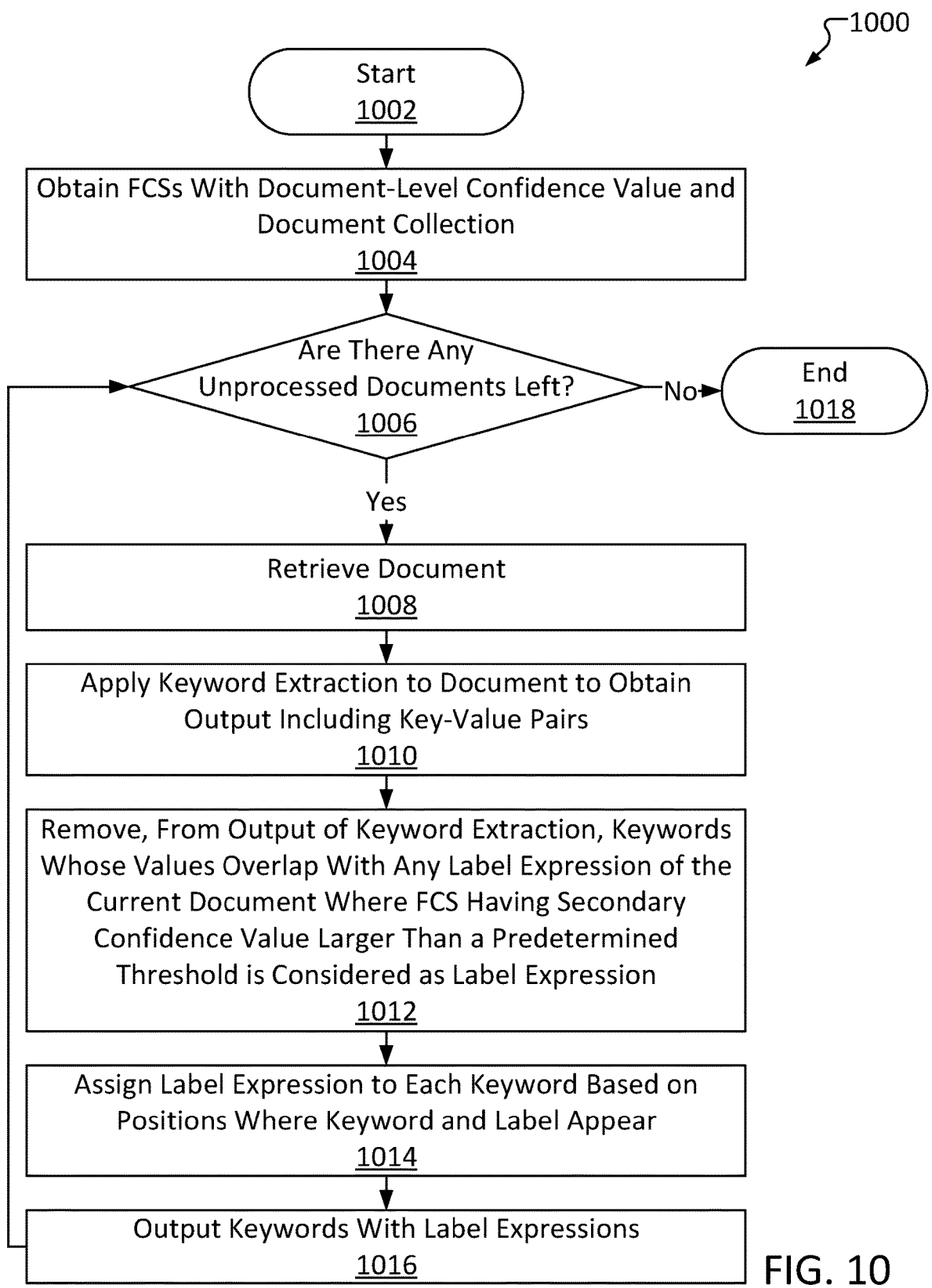
FIG. 10 is a method of a third subprocess in the main process shown in FIG. 2, consistent with several embodiments of the present disclosure.

Hereinafter, with reference to a series of FIG. 2 through FIGS. 11A-D, a process for performing text mining on a document according to an exemplary embodiment of the present invention is described. FIG. 2 shows a flowchart of a main process for performing text mining on a given set of documents. FIG. 3, FIG. 9 and FIG. 10 show flowcharts of subprocesses in the main process shown in FIG. 2. FIG. 4, FIG. 6 and FIG. 8 show flowcharts of subprocesses of the first subprocess shown in FIG. 3. FIG. 5 shows data structures generated during the first subprocess shown in FIG. 4. FIG. 7 shows a data structure used in the subprocess shown in FIG. 6. FIGS. 11A-11D show data structures generated during the main process shown in FIG. 2.

The process shown in the series of FIG. 2 through FIGS. 11A-D may be performed by processing circuitry such as a processing unit of a computer system that implements at least one of aforementioned modules shown in FIG. 1A and FIG. 1B. In the described embodiment, each document is represented by a character sequence.

FIG. 2 is a method 200 of a main process for performing text mining on a given set of documents, consistent with several embodiments of the present disclosure. Method 200 may start at operation 202 in response to receiving, from an operator, a request for text mining with a designation of a document collection, for instance. However, the way to initiate the process is not limited, and in other embodiments method 200 may begin in response to any event, including an update of document collection, addition of a document to the document collection, a trigger event, an implicit request, a timer, etc.

Figures 11A, 11B, 11C, 11D:
FIG. 11A depicts an example document collection generated during the main process shown in FIG. 2, consistent with several embodiments of the present disclosure.
FIG. 11B depicts an example list of frequent character sequences (FCSs) together with primary confidence values, consistent with several embodiments of the present disclosure.
FIG. 11C depicts an example list of pairs of an FCS and a document identification (DOCUMENT ID) with secondary confidence values, consistent with several embodiments of the present disclosure.
FIG. 11D depicts an example set of tuples including a key, a value, and a category label, consistent with several embodiments of the present disclosure.

Method 200 comprises preparing a document collection designated by the request at operation 204. Operation 204 may include, for example, concatenating characters of a set of documents into a character array. An example document collection 1100, including example document 1102, is shown in FIG. 11A, for example. Note that the process shown in the series of FIG. 2 through FIGS. 11A-D performs keyword extraction to each document ($d_i$; i=1, . . . , N) in the designated document collection (D) as a target document.

Method 200 further comprises extracting one or more frequent character sequences (FCS) from the document collection (D) at operation 206. Operation 206 may include computing an occurrence frequency (freq(s)) for each extracted FCS (s) across the document collection (D). A primary confidence value (a collection-level confidence value; conf(s)) is associated with each extracted FCS (s) in a manner based on at least occurrence frequency change relating to each FCS observed in each document. A list of FCSs with primary confidence values shown in FIG. 11B is obtained from the document collection (D) shown in FIG. 11A.

Method 200 further comprises adjusting, at operation 208, for each document ($d_i$; i=1, . . . , N) in the document collection (D), the primary confidence value for each FCS obtained at operation 206 to compute a secondary confidence value. Operation 208 may include evaluating the secondary confidence value of each FCS being a label expression in each document. A list of pairs of an FCS and a document identification (DOCUMENT ID) with the secondary confidence values is shown in FIG. 11C, which may be obtained from the list of FCSs with the primary confidence values shown in FIG. 11B.

Method 200 further comprises extracting, at operation 210, one or more keywords from each document ($d_i$; i=1, . . . , N) in the document collection (D) based on the result operation 208, which may include the evaluation of the confidence of each FCS observed in each document. Method 200 ends at 212.

FIG. 3 is a method 300 of a first subprocess in the main process 200 shown in FIG. 2, consistent with several embodiments of the present disclosure. In particular, method 300 is a first subprocess of operation 206 of method 200 as described above with reference to FIG. 2. Method 300 may begin at 302 in response to operation 206 being performed. Method 300 comprises obtaining the document collection (D) and reading predetermined parameters (f, m) and rules if necessary at operation 304.

Method 300 further comprises enumerating FCSs observed in the document collection (D) with an occurrence frequency (freq(s)) of each sequence (s) at operation 306.

Method 300 further comprises choosing FCSs that satisfy a "condition of maximality" to aggregate the substrings into a longer frequent sequence at operation 308. The "condition of maximality" is a condition with respect to occurrence frequency change between FCS (s) and a longer FCS (y) containing the FCS (s).

Method 300 further comprises filtering the chosen FCSs at operation 310. FCSs may be filtered, for example, based upon a determination of whether they satisfy a filtering condition with respect to at least the number of documents (F(s)) containing each FCS (s). Method 300 further comprises computing, at operation 312, a primary confidence value (i.e., the collection-level confidence value) for each remaining FCS across the document collection (D) based on the neighboring character distribution of each FCS.

Method 300 further comprises outputting a list of the remaining FCSs with their primary confidence values at operation 314. An example output list is shown in FIG. 11B. Method 300 ends at 316 and control returns to the main process shown in FIG. 2. By performing the subprocess shown in FIG. 3, one or more FCS extracted from the document collection (D) having structured contents at least in part are obtained.

FIG. 4 is a first subprocess 400 of the first subprocess 300 shown in FIG. 3, consistent with several embodiments of the present disclosure. Specifically, FIG. 4 shows a flowchart of a subprocess 400 of operation 306 first subprocess 300 shown in FIG. 3. FIG. 5 shows a set 500 of data structures generated during subprocess 400 shown in FIG. 4.

Subprocess 400 begins at 402 in response to operation 306 being performed. Subprocess 400 comprises concatenating all the characters in all the documents in the document collection D with a special delimiter (e.g., "$") to create a character array at operation 404. In FIG. 5, there are two documents including a first document 502 ("abracadabra") and a second document 504 ("abaha") and then the character array 506 ("abracadabra$abaha$") is generated.

Subprocess 400 further comprises constructing a suffix array of all the characters in the character array at operation 406. Operation 406 may include enumerating all the possible suffixes (depicted as suffix array 508) and sorting them alphabetically (depicted as suffix array 510).

Subprocess 400 further comprises scanning, at operation 408, the suffix array to enumerate character sequences whose occurrence frequency and length satisfy predetermined conditions, which is designated by a given parameter. The parameter may include, for example, a minimum frequency (f) and a minimum length (m) for enumeration and the condition may be represented by freq(s)>=f && length(s)>=m.

Subprocess 400 further comprises outputting a list of enumerated character sequences as FCSs with their occurrence frequencies at operation 410. An example list is shown in FIG. 5 as list 512. Subprocess 400 ends at 412 and control returns to subprocess 300 shown in FIG. 3.

FIG. 6 is a flowchart of a second subprocess 600 of the subprocess 300 shown in FIG. 3, consistent with several embodiments of the present disclosure. In particular, subprocess 600 may be performed in response to operation 308 of the subprocess 300 shown in FIG. 3. The result of the first subprocess 400 shown in FIG. 4 is given to subprocess 600. Subprocess 600 may begin at 602 in response to operation 308 being performed. Subprocess 600 comprises determining whether any FCSs remain unprocessed at operation 604.

If it is determined that there is at least one unprocessed FCS left (604 "Yes"), subprocess 600 further comprises selecting an unprocessed FCS at operation 606.

Subprocess 600 further comprises determining whether there is another FCS (y) such that s is prefix of y and s satisfies a predetermined condition or not at operation 608. This predetermined "branch condition" is related to the condition of maximality, which in turn is a condition with respect to occurrence frequency change between the sequence (s) and a longer sequence (y) containing the sequence (s). As an example, the branch condition may be whether freq(y)>=b*freq(s), where the parameter b is in the interval [0,1] and generally close to 1 (an example value of b is 0.7). In such an instance, operation 608 may thus include determining whether there is another FCS (y) such that s is prefix of y and whether s and y satisfy freq(y)>, b*freq(s). Existence of the longer FCS (y) for the FCS (s) satisfying freq(y)>=b*freq(s) means that the currently selected FCS (s) is expected to be a partial sequence of the longer FCS (y) having a similar occurrence frequency to the currently selected FCS (s) and hence the FCS (y) is more likely to be a label expression. For example, if s is "even," y is "event," and freq(event)>=b*freq(even), then "even" may be less likely to be the label expression than "event" as "even" may only occurs frequently due to its inherent inclusion in "event." Freq(event) has a maximum value of freq(even), as no instance of "event" can occur without a corresponding "even." Thus, parameter b is included to represent a similarity threshold; where b=0.7, freq(event)>=b*freq(even) essentially checks whether at least 70% of the instances of "even" are merely the first four characters of "event." If this check is met, then "even" is not likely to be a label expression, as it is only frequently occurring due to its inclusion in "event" (if anything, "event" could still be a label expression). If there is no FCS (y) for the FCS (s) satisfying freq(x)>=b*freq(s), the condition of the maximality is met for the currently selected FCS (s).

FIG. 7 shows a data structure 700 used in subprocess 600 described above with reference to FIG. 6. In general, the occurrence frequency of the substring is not less than the occurrence frequency of the longer sequence containing the substring as illustrated in FIG. 7. The occurrence frequency generally does not change while the string is a part of a frequently used contiguous string in the documents and drops when the next longer sequences is variable. For instance, the substrings "eve," "even," and "event" would have same or similar frequency to the string "event:" since these substrings almost always appear as a part of the string "event:". However, there are several variations that include the string "event:" in a part since the string "event:" would be used in variated contexts such as "event:Sale" "event: Delivery," etc. By considering this occurrence frequency change it is easier to extract semantically continuous strings 702 rather than extract strings based on simple frequencies 704.

Referring back to FIG. 6, if it is determined that there is no FCS (y) containing the FCS (s) (608 "No"), i.e., the condition of maximality is met, subprocess 600 proceeds to outputting the selected FCS (s) at operation 612 and looping back to operation 604 for another unprocessed FCS (if any).

On the other hand, if it is determined that there is at least one FCS (y) containing the FCS (s) satisfying the predetermined condition (608 "Yes"), i.e., the condition of maximality is not met, subprocess 600 proceeds to determining, at operation 610, whether the FCS (s) satisfies one of given rules for enumeration or not to enumerate an additional sequence as an FCS even if this additional sequence is evaluated to be likely to a part of the longer frequent sequence that is more likely to the label expression. This enumeration rule defines a condition for enumerating a sequence having a predetermined pattern. For example, if there is knowledge that a certain symbol is used in the document form, a sequence including the certain symbol may be extracted by pattern matching using a regular expression. Such an enumeration rule may be built manually by considering the document type or may be refined manually or automatically by analyzing the previous result of subprocess 300 (described above with reference to FIG. 3).

For example, by analyzing the extracted FCSs obtained from subprocess 400 (described above with reference to FIG. 4), FCSs whose peripheral context (as described by a content word and/or a format described by a symbol) are limited and that has the primary confidence values higher than a threshold can be extracted. By utilizing the extracted frequent format, the additional sequence may be extracted from the document collection (D). For instance, when strings 'problem' 'technique' and 'advantage' often accompany symbols "[" and "]" at its peripheral, the string "[Example]" can be picked up as an additional FCS by using symbols "[" and "]" as a clue.

If it is determined that the FCS (s) does satisfy one of the given rules for enumeration (610 "Yes"), subprocess 600 may proceed to output the FCS at operation 612. On the other hand, if it is determined that the FCS (s) does not satisfy any one of the given rules for enumeration (610 "No"), subprocess 600 may loop back to operation 604 for another FCS (if any), and the currently selected FCS (s) is discarded.

Referring to operation 604 again, if it is determined that no unprocessed FCS remains (604 "No"), subprocess 600 may end at 614, wherein control may return to the subprocess 300 shown in FIG. 3.

FIG. 8 is flowchart of a third subprocess 800 of subprocess 300 shown in FIG. 3, consistent with several embodiments of the present disclosure. In particular, subprocess 800 may begin at 802 in response to operation 310 being performed. The result of subprocess 600 (described above with reference to FIG. 6) is input to subprocess 800.

Subprocess 800 comprises determining whether there are any unprocessed FCSs left or not at operation 804. If it is determined that there is at least one unprocessed FCS left (804 "Yes"), subprocess 800 proceeds to selecting an unprocessed FCS at operation 806. For purposes of this discussion, the FCS selected at operation 806 is referred to as "s."

Subprocess 800 further comprises computing the number of documents containing the selected FCS (F(s)) at operation 808. To accomplish this, operation 808 may also include, for example, obtaining a number of documents (N) in the document collection (D).

Subprocess 800 further comprises determining whether the selected FCS(s) satisfies a predetermined filtering condition regarding the numbers of documents (N and F(s)) at operation 810. The filtering condition may define a condition for extracting those that appear a predetermined number of times (e.g., only one time) in one document and appear uniformly across all the documents. As an example, a system performing subprocess 800 may, at operation 810, determine whether the condition (1−a) N<=F and freq (s)<=N is met or not, where the parameter a is a parameter value in the interval [0,1] and generally close to 0. A typical value of a is 0.05, for instance. This particular filtering condition extracts FCSs that appear one time in one document and appear uniformly across most documents. The parameter a defines the threshold of being "most." This particular embodiment is merely an example and in other embodiments, more relaxed conditions and/or more restricted conditions may also be contemplated.

For example, the filtering condition may include a condition of locality for extracting FCSs that are located at a specific region in a document and not distributed uniformly over the document. In order to test the condition of locality, each document ($d_i$) may be divided into plural document partitions ($dp_{ij}$, where i represents the identification of the document and j represents the identification of the document partition in the document $d_i$), such as paragraphs. The document partitions of all the documents are aggregated to form a set of document partitions (DP={$dp_{11}$, $dp_{1M1}$, $dp_{21}$, $dp_{2M2}$, $dp_{N1}$, $dp_{NMN}$}) where Mi (i=1, N) denotes the number of the document partitions in the document i. Let the number of documents containing the FCS be F(s) and the number of document partitions containing the FCS be FP(s). MP represents the summation of Mi (i=1, . . . N). The condition of locality can be formulated according to Equation (4) and (5) as follows:

$$(1-a)N < F(s) \quad (4)$$

$$\frac{\frac{FP(s)}{MP}}{\frac{F(s)}{N}} < c \quad (5)$$

where a and c are parameters in the interval [0,1].

Equations (4) and (5) identify an FCS (s) that has high or moderate occurrence frequency in the document and is located locally (i.e., is not distributed uniformly across the document partitions).

If it is determined that the selected FCS (s) satisfies the filtering condition (810 "Yes"), subprocess 800 proceeds output the selected FCS (s) at operation 812 and loops back to operation 804 for another unprocessed FCS (if any). On the other hand, if it is determined that the selected FCS (s) does not satisfy the filtering condition (810 "No"), subprocess 800 may loop back operation 804 while discarding the selected FCS (s).

Referring again to operation 804, if it is determined that no unprocessed FCS remains (804 "No"), subprocess 800 may end at 814, at which point control may return to subprocess 300 (described above with reference to FIG. 3).

Referring back to FIG. 3, Subprocess 300 further comprises computing the primary confidence value (i.e., the collection-level confidence value) for each remaining FCSs across the document collection (D). For an FCS (s=$c_1 c_2 \ldots c_n$, where $c_i$ denotes a character and n denotes the length of FCS) an exemplary implementation of the primary confidence value (conf(s)) of each remaining FCS may be formulated according to Equations (1)-(3), described above and reproduced here:

$$conf(s) = conf_1(s) \cdot conf_2(s) \quad (1)$$

$$conf_1(s) = freq(s)/freq(x) \quad (2)$$

$$conf_2(s) = \left(1 - \frac{freq(y)}{b \cdot freq(s)}\right) \quad (3)$$

where freq(s) is the occurrence frequency of FCS (s) in the whole document collection (D).

The confidence value conf(s) of FCS (s) is a real value between 0 and 1 such that a larger value means a higher confidence in s being a label expression.

According to the aforementioned implementation, for instance, $conf_1$("[event]<space>") becomes large when freq ("[event]<space>") is close to freq("[event]"), and the $conf_2$ ("[event]<space>") also becomes large when the next character is variable. For other instance, $conf_2$("statistic") becomes small when freq("statistics") is close to b*freq ("statistic"). A larger value of $conf_1$(s) means that FCS (s) is more likely to be a label expression than its prefix (i.e., conf(s)>conf(x)). A larger value of $conf_2$(s) means that FCS s is more likely to be a label expression than any longer FCS of which s is a prefix (e.g., conf(s)>conf(y)).

FIG. 9 is a flowchart of a second subprocess 900 of the main process 200 (described above with reference to FIG. 2). Subprocess 900 begins at 902 in response to operation 208 being performed. Subprocess 900 comprises obtaining FCSs with their primary confidence values at operation 904. Operation 904 may include, for example, receiving a result of the subprocess 300 performed as part of operation 206. An example list of FCSs with their primary confidence values is provided as list 1104 in FIG. 11B. Operation 904 may further include receiving the document collection (D) and a symbol list that is a predefined collection of formatting characters given for the system such as "[", "]", ":", etc.

Subprocess 900 further comprises decomposing each FCS that has a symbol into a symbol part and a remaining part at operation 906. Note that an FCS containing a symbol part is referred to as an extended label. In some instances, all FCSs enumerated for each document are subjected to the decomposition at operation 906. An FCS without a symbol may simply be comprised entirely of a "remaining part."

Subprocess 900 further comprises determining whether any unprocessed document remains at operation 908. If it is determined that there is at least one unprocessed document left (908 "Yes"), subprocess 900 proceeds to retrieving one document ($d_i$) at operation 910. Subprocess 900 further comprises computing, at operation 912, a likelihood of each symbol in the symbol list being contained in any frequent sequence (the extended label) observed in the target document($d_i$). Subprocess 900 further comprises adjusting the primary confidence value (conf(s)) so as to compute a secondary confidence value for the FCS within the target document at operation 914. Operation 914 may include, for example, increasing or decreasing the primary confidence value for the FCS by a predetermined amount according to the likelihood computed at operation 912 to obtain the secondary confidence value. For example, a confidence value of an FCS including a symbol that is determined to have a large likelihood to be contained in any frequent sequence may be increased.

For instance, when "[" is frequently included in the FCSs with a high confidence value in the target document, then, the confidence value of the FCSs including "[" may be raised. In addition to or in place of raising the confidence value, the confidence value of the FCSs not including "[" may be reduced. This adjustment enables a system performing subprocess 900 to account for variation of expressions between documents and integrity of expressions within each document. The amount to increase or decrease is not limited and may be fixed as long as the likelihood is above a threshold or varied depending on the value of the computed likelihood.

Subprocess 900 further comprises outputting the secondary confidence value (document-level confidence value) on each match of the FCS in the document ($d_i$) at operation 916 and looping back to operation 908 for another document (if any).

Referring again to operation 908, if it is determined that there are no unprocessed documents (908 "No"), subprocess 900 may end at 912, wherein control may return to the main process 200 (described above with reference to FIG. 2).

FIG. 10 is a flowchart of a third subprocess 1000 of the main process 200, consistent with several embodiments of the present disclosure. In particular, subprocess 1000 may begin 1002 in response to operation 210 being performed. Subprocess 1000 comprises obtaining FCSs with their secondary confidence values at operation 1004, which is the result of the second subprocess 900 of operation 208, described above with reference to FIG. 9. An example list is shown as list 1106 in FIG. 11C.

Subprocess 1000 further comprises determining whether there are any unprocessed documents at operation 1006. If it is determined that there is at least one unprocessed document left (1006 "Yes"), subprocess 1000 proceeds to retrieving one document ($d_i$) at operation 1008. Subprocess 1000 further comprises applying keyword extraction to the retrieved document ($d_i$) at operation 1010 to obtain an output including key-value pairs.

Subprocess 1000 further comprises removing, at operation 1012 from the output of the keyword extraction, keywords whose value (content) overlap with any FCS considered a label expression of the current document ($d_i$). For example, an FCS having a secondary confidence value (i.e., a document-level confidence value) above a predetermined threshold may be considered a label expression for the current document, and thus operation 1012 may include removing keywords whose values overlap with such an FCS. A keyword that appears in all the documents would give less information in the text mining system and the extraction of such common keywords would constitute noise. By removing the FCS that is considered as the label expression from the keyword extraction result, the efficiency of the text mining can be improved.

Subprocess 1000 further comprises assigning a label to each extracted keyword based on positions where the keyword and label expression have appeared at operation 1014. For example, a label observed at a nearest upper position of each keyword is assigned to the keyword. As an explanatory example, when reading through a document from top to bottom, upon encountering the keyword, the most recently encountered label is assigned. Also, the label assigned to the keyword may be the "remaining part" of the FCS (i.e., other than the "symbol part" of an FCS that includes a symbol).

Subprocess 1000 further comprises outputting the keyword with the label at operation 1016. Operation 1016 may include, for example, obtaining a set of tuples including a key, a value and a category label. An example set of such tuples (where the category label is an extracted label expression after the symbol removal) is provided as set 1108 in FIG. 11D. Subprocess 1000 may then loop back to operation 1006 to iterate through remaining documents (if any).

Referring again to operation 1006, if it is determined that there are no unprocessed documents left (1006 "No"), subprocess 1000 may end at 1018, wherein the control may return to the main process 200 shown in FIG. 2.

According to the aforementioned embodiments, the computer-implemented methods, the computer systems and the computer program products capable of extracting a plausible label expression that is observed in the set of documents and indicates structured contents of the documents is provided.

For example, for certain types of documents such as annual securities reports of companies, keywords that appear in almost all documents can be extracted. This is different from, for example, respondence records of call centers, in which distribution of various keywords generally follows Zipf's law (stating that, given some corpus of natural language utterances, the frequency of any word is inversely proportional to its rank in a frequency table). The extraction of the label expression enables information extraction from a document in association with such label expression. The keywords observed in the documents are interpreted according to the document structure indicated by the label expressions.

For examples, the keyword "Security" observed at the section "Business details" can be interpreted in the context of the description of business (e.g., a business that provides security services). The keyword "Security" observed at the section "Business risk" is interpreted in the context of the risk of the business (e.g., security concerns of the business itself). Furthermore, it is also possible to grasp whole keywords hierarchically by hierarchizing semantic features (facets) consisting of the extracted label expressions.

Furthermore, the preprocessing of dividing each document into non-analysis parts and analysis parts, which is generally required without using the novel technique according to the embodiment, can be omitted and workload for the preprocessing can be reduced.

Note that the languages to which the novel technique according to the embodiments of the invention is applicable is not limited and examples of such the languages may include, by no means limited to, Arabic, Chinese, English, Esperanto, French, German, Japanese, Korean, Portuguese, Russian, Swedish, Spanish, for instance.

Although the advantages obtained with respect to the one or more specific embodiments according to the present invention have been described, it should be understood that some embodiments may not have these potential advantages, and these potential advantages are not necessarily required of all embodiments.

Figure 12:
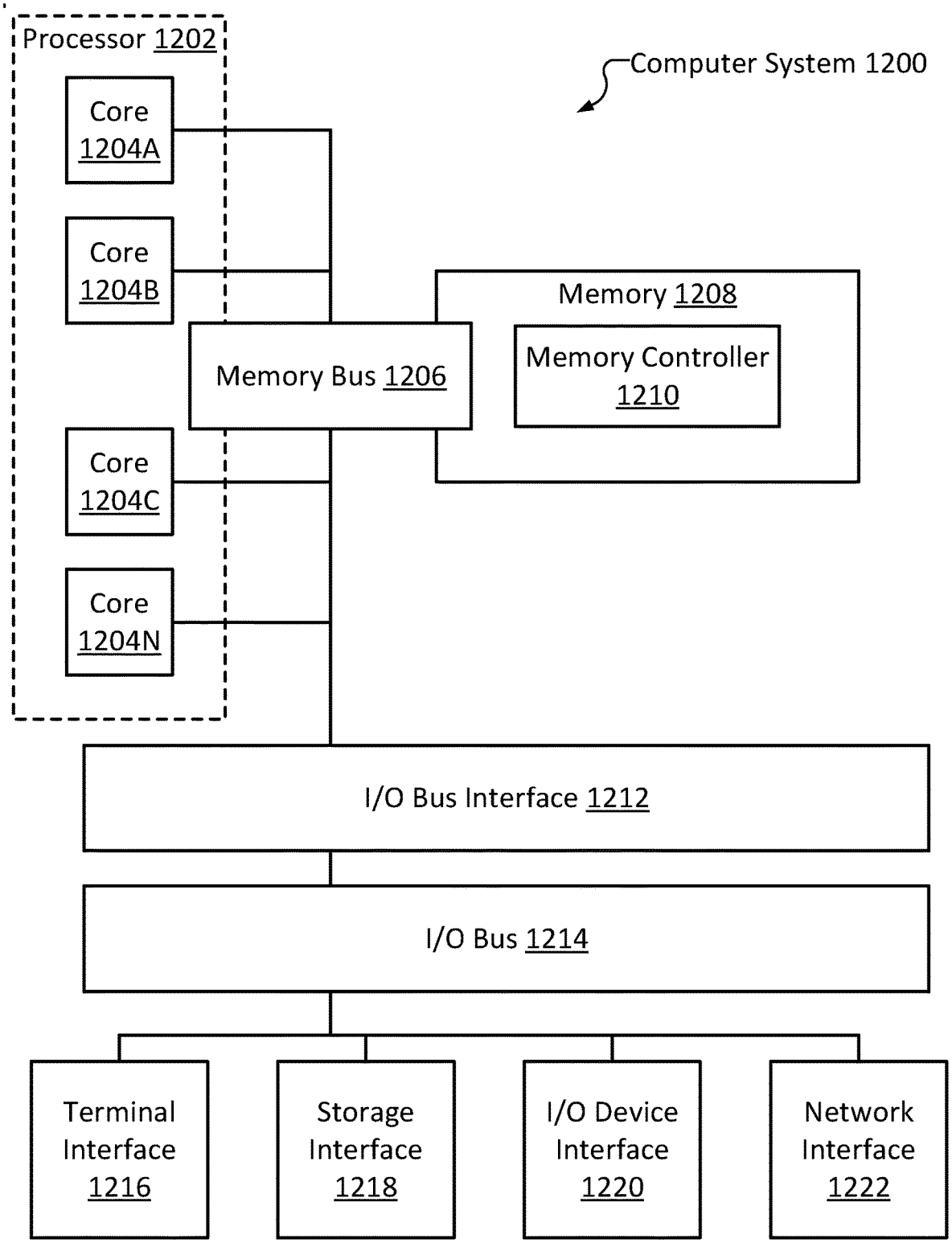
FIG. 12 illustrates a high-level block diagram of an example computer system that may be used in implementing embodiments of the present disclosure.

Referring now to FIG. 12, shown is a high-level block diagram of an example computer system 1200 that may be configured to perform various aspects of the present disclosure, including, for example, process 200 and subprocesses 300, 400, 600, 800, 900, and 1000. The example computer system 1200 may be used in implementing one or more of the methods or modules, and any related functions or operations, described herein (e.g., using one or more processor circuits or computer processors of the computer), in accordance with embodiments of the present disclosure. In some embodiments, the major components of the computer system 1200 may comprise one or more CPUs 1202, a memory subsystem 1208, a terminal interface 1216, a storage interface 1218, an I/O (Input/Output) device interface 1220, and a network interface 1222, all of which may be communicatively coupled, directly or indirectly, for inter-component communication via a memory bus 1206, an I/O bus 1214, and an I/O bus interface unit 1212.

The computer system 1200 may contain one or more general-purpose programmable processors 1202 (such as central processing units (CPUs)), some or all of which may include one or more cores 1204A, 1204B, 1204C, and 1204N, herein generically referred to as the CPU 1202. In some embodiments, the computer system 1200 may contain multiple processors typical of a relatively large system; however, in other embodiments the computer system 1200 may alternatively be a single CPU system. Each CPU 1202 may execute instructions stored in the memory subsystem 1208 on a CPU core 1204 and may comprise one or more levels of on-board cache.

In some embodiments, the memory subsystem 1208 may comprise a random-access semiconductor memory, storage device, or storage medium (either volatile or non-volatile) for storing data and programs. In some embodiments, the memory subsystem 1208 may represent the entire virtual memory of the computer system 1200 and may also include the virtual memory of other computer systems coupled to the computer system 1200 or connected via a network. The memory subsystem 1208 may be conceptually a single monolithic entity, but, in some embodiments, the memory subsystem 1208 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 1208 may contain elements for control and flow of memory used by the CPU 1202. This may include a memory controller 1210.

Although the memory bus 1206 is shown in FIG. 12 as a single bus structure providing a direct communication path among the CPU 1202, the memory subsystem 1208, and the I/O bus interface 1212, the memory bus 1206 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1212 and the I/O bus 1214 are shown as single respective units, the computer system 1200 may, in some embodiments, contain multiple I/O bus interface units 1212, multiple I/O buses 1214, or both. Further, while multiple I/O interface units are shown, which separate the I/O bus 1214 from various communications paths running to the various I/O devices, in other embodiments some or all of the I/O devices may be connected directly to one or more system I/O buses.

In some embodiments, the computer system 1200 may be a multi-user mainframe computer system, a single-user system, or a server computer or similar device that has little or no direct user interface but receives requests from other computer systems (clients). Further, in some embodiments, the computer system 1200 may be implemented as a desktop computer, portable computer, laptop or notebook computer, tablet computer, pocket computer, telephone, smart phone, mobile device, or any other appropriate type of electronic device.

It is noted that FIG. 12 is intended to depict the representative major components of an exemplary computer system 1200. In some embodiments, however, individual components may have greater or lesser complexity than as represented in FIG. 12, components other than or in addition to those shown in FIG. 12 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for mining text by a computer-based text mining system, comprising:
    obtaining, by the text mining system, a first frequent sequence of characters from a set of documents, the set of documents having structured contents according to a common rule, wherein the first frequent sequence satisfies a condition of maximality and the satisfying of the condition of maximality comprises:
        performing a first comparison, the first comparison comprising comparing a first occurrence frequency of the first frequent sequence to a second occurrence frequency of a second sequence, wherein the second sequence is longer than the first sequence and the second sequence contains the first sequence;
    determining that the first frequent sequence includes a symbol and the symbol comprises formatting data for a target document;
    decomposing, responsive to the determining the first frequent sequence includes a symbol, the first frequent sequence into a symbol part and a remaining part;
    evaluating, by the text mining system and based on the comparing, a first confidence of the first frequent sequence being a label expression, wherein the label expression represents a document part in the target document, the evaluating the first confidence comprises:
        calculating a primary confidence value for the first frequent sequence across the set of documents;
        computing a likelihood of the symbol being contained in the first frequent sequence observed in the target document; and
        adjusting the primary confidence value, resulting in a secondary confidence value for the first frequent sequence within the target document, wherein the adjusting the primary confidence value for the first frequent sequence to obtain the secondary confidence value is based on the likelihood of the symbol being contained in the first frequent sequence;

determining that the first confidence is above a confidence threshold;

extracting, in response to the determining the first confidence is above the confidence threshold and by the text mining system, one or more keywords from the target document based on the secondary confidence value of the first frequent sequence, wherein the extracting the one or more keywords further comprises:

applying keyword extraction to the target document, resulting in a set of keywords;

identifying that a first keyword included in the set of keywords overlaps with the first frequent sequence;

removing, based on the determining and on the identifying, the first keyword from the set of keywords; and assigning a label relating to the first frequent sequence to a second keyword included in the set of keywords, the assigning based on positions in the target document where the first frequent sequence and the second keyword have appeared; and outputting the one or more keywords and the secondary confidence value.

2. The method of claim 1, wherein the obtaining the first frequent sequence further comprises filtering the first frequent sequence based on a filtering condition with respect to at least a number of documents containing the first frequent sequence.

3. The method of claim 1, wherein the obtaining the first frequent sequence further comprises enumerating an additional sequence based on a predetermined enumeration rule.

4. The method of claim 1, wherein obtaining a first frequent sequence further comprises:

concatenating characters of each of the set of documents into a character array;

enumerating, based on the character array, each of a set of enumerated sequences observed in the set of documents with an occurrence frequency of each enumerated sequence observed in the set of documents;

performing a second comparison, the second comparison including comparing a third occurrence frequency of a first enumerated sequence from the set of enumerated sequences to a fourth occurrence frequency of a longer enumerated sequence containing the first enumerated sequence; and designating, based on the second comparison, the first enumerated sequence as the first frequent sequence.

5. The method of claim 1, wherein the first confidence is evaluated based on:

the first occurrence frequency of the first frequent sequence;

a fifth occurrence frequency of a substring of the first frequent sequence;

a sixth occurrence frequency of a longer sequence containing the first frequent sequence; and the first confidence is calculated by:

$$\mathrm{conf}(s) = \mathrm{conf}_1(s) \cdot \mathrm{conf}_2(s)$$

where:

$$conf_1(s) = freq(s)/freq(x) \text{ and } conf_2(s) = \left(1 - \frac{freq(y)}{b \cdot freq(s)}\right)$$

where conf(s) is the first confidence, the freq(s) is the first occurrence frequency, the freq (x) is the fifth occurrence frequency, the freq (y) is the sixth occurrence frequency, and the b is a weighting factor.

6. The method of claim 1, wherein:
each document is written in a natural language; and
each frequent sequence is a frequently occurring character sequence.

7. The method of claim 1, wherein the secondary confidence is increased in response to determining the symbol is included in the first frequent sequence in a target document.

8. The method of claim 1, wherein the keyword comprises a key, a value, and a category label, the category label is associated with the first frequent sequence, and the category label is the remaining part of the first frequent sequence.

9. A computer based text mining system, comprising:
a memory; and
a processor coupled to the memory, the processor configured to cause the text mining system to:

obtain, by the text mining system, a first frequent sequence of characters from a set of documents, the set of documents having structured contents according to a common rule, wherein the first frequent sequence satisfies a condition of maximality and satisfying the condition of maximality comprises:

performing a first comparison, the first comparison including comparing a first occurrence frequency of the first frequent sequence to a second occurrence frequency of a second sequence, wherein the second sequence is longer than the first sequence and the second sequence contains the first sequence;

determine that the first frequent sequence includes a symbol and the symbol comprises formatting data for a target document;

decompose, responsive to the determining the first frequent sequence includes a symbol, the first frequent sequence into a symbol part and a remaining part;

evaluate, based on the comparing, a first confidence of the first frequent sequence being a label expression, wherein the label expression represents a document part in the target document, the evaluating the first confidence comprises:

calculating a primary confidence value for the first frequent sequence across the set of documents; and computing a likelihood of the symbol being contained in the first frequent sequence observed in the target document; and adjusting the primary confidence value, resulting in a secondary confidence value for the first frequent sequence within the target document, wherein the adjusting the primary confidence value for the first frequent sequence to obtain the secondary confidence value is based on the likelihood of the symbol being contained in the first frequent sequence;

determine that the first confidence is above a confidence threshold;

extract, in response to the determining the first confidence is above the confidence threshold and by the text mining system, one or more keywords from the target document based on the secondary confidence value of the first frequent sequence, wherein the extracting the one or more keywords further comprises:

apply keyword extraction to the target document, resulting in a set of keywords;

identify that a first keyword included in the set of keywords overlaps with the first frequent sequence;

remove, based on the determining and on the identifying, the first keyword from the set of keywords; and
assign a label relating to the first frequent sequence to a second keyword included in the set of keywords, the assigning based on positions in the target document where the first frequent sequence and the second keyword have appeared; and
output the one or more keywords and the secondary confidence value.

10. The computer system of claim 9, wherein the obtaining the first frequent sequence further comprises:
filtering the first frequent sequence based on a filtering condition with respect to at least a number of documents containing the first frequent sequence; and
enumerating an additional sequence based on a predetermined enumeration rule.

11. The computer system of claim 9, wherein obtaining a first frequent sequence comprises:
concatenate characters of each of the set of documents into a character array;
enumerate, based on the character array, each of a set of enumerated sequences observed in the set of documents with an occurrence frequency of each enumerated sequence observed in the set of documents;
perform a second comparison, the second comparison including comparing a third occurrence frequency of a first enumerated sequence from the set of enumerated sequences to a fourth occurrence frequency of a longer enumerated sequence containing the first enumerated sequence; and
designate, based on the second comparison, the first enumerated sequence as the first frequent sequence.

12. A computer program product for a text mining system, comprising a computer readable storage medium having program instructions embodied therewith, the program instructions executable by a computer to cause the computer to:
obtain, by the text mining system, a first frequent sequence of characters from a set of documents, the set of documents having structured contents according to a common rule, wherein the first frequent sequence satisfies a condition of maximality and satisfying the condition of maximality comprises:
performing a first comparison, the first comparison including comparing a first occurrence frequency of the first frequent sequence to a second occurrence frequency of a second sequence, wherein the second sequence is longer than the first sequence and the second sequence contains the first sequence;
determine that the first frequent sequence includes a symbol and the symbol comprises formatting data for a target document;
decompose, responsive to the determining the first frequent sequence includes a symbol, the first frequent sequence into a symbol part and a remaining part;
evaluate, by the text mining system and based on the comparing, a first confidence of the first frequent sequence being a label, wherein the label represents a document part in the target document, the evaluating the first confidence comprises:
calculating a primary confidence value for the first frequent sequence across the set of documents;
computing a likelihood of the symbol being contained in the first frequent sequence observed in the target document; and
adjusting the primary confidence value, resulting in a secondary confidence value for the first frequent sequence within the target document, wherein the adjusting the primary confidence value for the first frequent sequence to obtain the secondary confidence value is based on the likelihood of the symbol being contained in the first frequent sequence;
determine that the first confidence is above a confidence threshold;
extract, in response to the determining the first confidence is above the confidence threshold and by the text mining system, one or more keywords from the target document based on the secondary confidence value of the first frequent sequence, wherein the extracting the one or more keywords further comprises:
apply keyword extraction to the target document, resulting in a set of keywords;
identify that a first keyword included in the set of keywords overlaps with the first frequent sequence;
remove, based on the determining and on the identifying, the first keyword from the set of keywords; and
assign a label relating to the first frequent sequence to a second keyword included in the set of keywords, the assigning based on positions in the target document where the first frequent sequence and the second keyword have appeared; and
perform, based on the extracting the one or more keywords, a search of the set of documents; and
output the one or more keywords and the secondary confidence value.

13. The computer program product of claim 12, wherein the obtaining the first frequent sequence further comprises:
filtering the first frequent sequence based on a filtering condition with respect to at least a number of documents containing the first frequent sequence; and
enumerating an additional sequence based on a predetermined enumeration rule.

14. The computer program product of claim 12, wherein obtaining a first frequent sequence comprises:
concatenate characters of each of the set of documents into a character array;
enumerate, based on the character array, each of a set of enumerated sequences observed in the set of documents with an occurrence frequency of each enumerated sequence observed in the set of documents;
perform a second comparison, the second comparison including comparing a third occurrence frequency of a first enumerated sequence from the set of enumerated sequences to a fourth occurrence frequency of a longer enumerated sequence containing the first enumerated sequence; and
designate, based on the second comparison, the first enumerated sequence as the first frequent sequence.

* * * * *